(12) United States Patent
Nakano

(10) Patent No.: US 7,218,688 B2
(45) Date of Patent: May 15, 2007

(54) DATA SLICER

(75) Inventor: Yoshiaki Nakano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 716 days.

(21) Appl. No.: 10/412,221

(22) Filed: Apr. 14, 2003

(65) Prior Publication Data

US 2003/0194023 A1    Oct. 16, 2003

(30) Foreign Application Priority Data

Apr. 16, 2002    (JP) .............................. 2002-113795

(51) Int. Cl.
*H04L 25/06* (2006.01)
*H03D 3/00* (2006.01)
*H04N 1/04* (2006.01)
*H03K 9/00* (2006.01)

(52) U.S. Cl. ...................... 375/317; 375/334; 375/316; 358/474

(58) Field of Classification Search ................ 375/317, 375/316, 334; 369/50; 358/474
See application file for complete search history.

(56) References Cited

U.S. PATENT DOCUMENTS 5,732,110 A  *  3/1998  Richards ..................... 375/334
5,960,046 A  *  9/1999  Morris et al. ................ 375/347
6,041,084 A  *  3/2000  Nagaraj ....................... 375/317
6,735,260 B1 *  5/2004  Eliezer et al. .............. 375/316
6,898,253 B2 *  5/2005  McNally ..................... 375/317

FOREIGN PATENT DOCUMENTS

JP    63-090221    4/1988

* cited by examiner

*Primary Examiner*—Mohammed Ghayour
*Assistant Examiner*—Cicely Ware
(74) *Attorney, Agent, or Firm*—Nixon & Vanderhye P.C.

(57) ABSTRACT

Data of the packet header is digitalized by a slicer circuit of a floating slice level mode, which follows DC voltage fluctuation, and packet data other than the packet header is digitalized by a slicer circuit of a fixed slice level mode, which does not follow DC voltage fluctuation. A default slice level of the fixed slice level mode is created by using demodulated data in a packet header section so as to accurately carry out switching of slicing methods. Obtained is a data slicer capable of accurately carrying out digitalization with respect to a signal, which is demodulated after being received.

14 Claims, 25 Drawing Sheets

DATA SLICER

FIELD OF THE INVENTION

The present invention relates to a data slicer for digitalizing a received signal such as a radio signal.

BACKGROUND OF THE INVENTION

Japanese Laid-Open Patent Application Tokukaisho 63-90221/1988 (published on Apr. 21, 1988) discloses a digitalization circuit using image sensor output, which includes output means for outputting intermittent image signals from an image sensor for scanning data of the document surface, first digitalizing means for digitalizing image signals outputted from the output means based on the integral value of the image signals, second digitalizing means for digitalizing the image signals outputted from the output means based on a single threshold voltage, and output difference detecting means for detecting the difference between two image signals adjacent to each other of the image signals outputted from the output means, wherein when the output difference detected by the detection means exceeds a predetermined value, a digitalization signal of the first digitalizing means is selected; and when the output difference is at or less than the predetermined value, a digitalization signal of the second digitalizing means is selected.

SUMMARY OF THE INVENTION

An object of the present invention is to provide a data slicer capable of accurately carrying out digitalization of a signal, which is demodulated after being received.

In order to achieve the foregoing object, a data slicer according to the present invention is a data slicer for carrying out digitalization of a demodulated signal obtained through receipt of packet data, which is made up of a packet header and user data sent after the packet header. The data slicer includes a slicer circuit of a floating slice level mode, which follows DC voltage fluctuation, and carries out slice level operation with respect to the packet header; and a slicer circuit of a fixed slice level mode, which does not follow DC voltage fluctuation, and carries out slice level operation with respect to packet data other than the packet header.

With this arrangement, by having a plurality of data slicing methods, and adopting the floating slice level mode capable of following rapid fluctuation of DC voltage only with respect to the packet header including superposed data, it is possible to carry out digitalization even in the standby state where the timing for receiving the input signal of the packet is unpredictable. Further, since the DC voltage becomes stabilized during the receipt of the packet header, the data slicer can use a data slicing method with a desirable BER and also not requiring consideration of rapid DC voltage fluctuation, with respect to the data after the packet header. Thus, it is possible to carry out digitalization with high-accuracy.

In addition to the foregoing arrangement, the data slicer according to the present invention further includes a default threshold creation circuit for determining a default threshold value in data slice operation of the fixed slice level mode; and is arranged so that the default threshold creation circuit creates the default threshold value of slice level of the slicer circuit of the fixed slice level mode, according to a measurement result of data included in the packet header.

In this arrangement, the default value of the slice level of the slicer circuit used for data after the packet header is created based on measurement result of the data included in the packet header. On other words, the default threshold creation circuit decides a default threshold by taking no account of output of the demodulated signal existing before the demodulated signal of the packet header. On this account, it is possible to obtain an accurate slice level, in addition to the effect with the foregoing arrangement.

In addition to the foregoing arrangement, the data slicer according to the present invention is arranged so that the default threshold creation circuit creates a default threshold value by using an intermediate voltage between a MIN voltage and a MAX voltage of amplitude of the demodulated signal of the packet header.

In this arrangement, an intermediate voltage between a MIN peak level and a MAX peak level of demodulation signal of the packet header is detected, and used as the default threshold value. Thus, in addition to the foregoing effect, it is possible to obtain a slice level for carrying out more exact digitalization.

In addition to the foregoing arrangement, the data slicer according to the present invention is arranged so that the default threshold creation circuit creates the default threshold value by integrating the demodulated signal in an ID data section where ID data is supplied, the ID data being prepared by superposing same sets of data and provided at an end of the packet header.

In this arrangement, only the DC component of the input signal can be taken out by cutting off the frequency component in the signal, and the DC component thus taken out can be used as a slice level. Therefore, in addition to the foregoing effects, it is possible to obtain a slice level for carrying out more precise digitalization.

In addition to the foregoing arrangement, the data slicer according to the present invention further includes a shift register for storing the demodulated signal, and capable of storing data of not more than whole data amount of the demodulated signal in the packet header; and is arranged so that the default threshold creation circuit reads a value stored in the shift register before and after the time of switching the slicing methods, and creates the default threshold value based on the value.

With this arrangement, since the demodulated data before the packet header is pushed out, and the shift register cannot store the data thus pushed out, only the demodulation data of the packet header is stored in the shift register. Therefore, in addition to the foregoing effects, it is possible to create more precise default threshold.

In addition to the foregoing arrangement, the data slicer according to the present invention further includes a threshold creation circuit for being supplied with the demodulated signal so as to create a slice level, and a shift register for storing the slice level created by the threshold creation circuit, the shift register storing the slice level for each predetermined data length; and is arranged so that the default threshold creation circuit reads a value stored in the shift register before and after the time of switching the slicing methods, and creates the default threshold value based on the value.

In this arrangement, the demodulated signal is supplied to the slice level creation circuit, and the shift register stores calculation result of the slice level for each predetermined data length, and the default threshold is created based on a value stored in the shift register by reading out the value before and after the time of switching the slicing methods.

The data amount of the slice level stored in the shift register is found by dividing the length of packet data by the predetermined data length.

With this arrangement, since the shift register stores calculation result of the inputted demodulation signal for each predetermined data length, it is not necessary to increase bit number of the shift register. Besides, since the data amount of the slice level stored in the shift register is determined to be a value found by dividing the length of packet data by the predetermined data length, calculation result before the packet header is pushed out, and the shift register cannot store the result as data.

In this arrangement, the threshold value is created only based on the demodulated signal of the packet header, since the value is determined by using the data stored in the shift register. Therefore, in addition to the foregoing effects, it is possible to provide an effect of creating more precise default threshold.

In addition to the foregoing arrangement, a data slicer according to the present invention further includes an ID detection circuit for detecting ID data, which is prepared by superposing same sets of data and provided at an end of the packet header; and is arranged so that the fixed slice level mode is selected in response to output of the ID detection circuit, to be used as a slicing method for carrying out digitalization of data immediately after the ID data detection and later data.

With this arrangement, since the slicing method is switched after the ID data detection, the switching timing of the slicing method becomes more exact. Therefore, in addition to the foregoing effects, it is possible to provide an effect of realizing a data slicer with higher accuracy.

In addition to the foregoing arrangement, a data slicer according to the present invention further includes a packet header time storing section for storing packet header receiving time, which is a time period consumed for receiving the packet header from a beginning to an end; and is arranged so that the fixed slice level mode is selected as a slicing method of the digitalization when the packet header receiving time is elapsed from a beginning of the receipt of packet data, the packet header receiving time being stored in the packet header storing section.

More specifically, the slicing method is not switched in the standby state, but can be switched in other states where sending and receiving are synchronized with each other and the input timing of the packet signal is predictable. This is because the finish time of the packet header can be predicted in this case, and the slicing method can be switched at this timing.

With this arrangement, even though the timing of receiving the packet is unpredictable in the standby state, it is not necessary to switch the slicing method, since the input signal is the packet only including ID data.

Meanwhile, once the ID data is received, the sending timing of the ID data is found out, and synchronization of the sending end and the receiving end can be made. Since the time period from the start of the receipt of the packet data to the end of the receipt of the ID data can be found out during the synchronization, and therefore, the finishing time of the receipt of the ID data can also be found out. Thus, even without the ID data detection, the slicing method is switched after a certain time period, which is from the beginning of the receipt of the packet data to the end of the receipt of the ID data, i.e., the method is switched at the end of the packet header. Therefore, in addition to the foregoing effects, it is possible to provide an effect of realizing a data slicer with higher accuracy.

In addition to the foregoing arrangement, a data slicer according to the present invention further includes a fluctuation amount detection circuit for detecting fluctuation amount of the demodulation signal in a certain time period; and a polarity judgment circuit for judging polarity of value of inclination which shows fluctuation quantity of the demodulated signal, and is detected by the fluctuation amount detection circuit; and is arranged so that the demodulated signal is digitalized according to the polarity of the value of inclination thus judged by the polarity judgment circuit.

With this arrangement, since the digitalization is carried out according to the polarity of the inclination of voltage fluctuation, the digitalization of the signal can basically be carried out without depending on the DC level of the input signal. Therefore, in addition to the foregoing effects, it is possible to provide an effect of realizing a data slicer with higher accuracy.

In addition to the foregoing arrangement, a data slicer according to the present invention is arranged so that when a signal voltage becomes higher than a MAX voltage, the MAX voltage is renewed to be equal to the signal voltage, and a MIN voltage is determined by subtracting a fixed value from the MAX value, and when a signal voltage becomes lower than the MIN voltage, the MIN voltage is renewed to be equal to the signal voltage, and the MAX voltage is determined by adding the fixed value to the MIN value, and an intermediate voltage between the MAX voltage and the MIN voltage is used as a threshold value level, and the digitalization is carried out by comparing the threshold value level and the signal voltage.

In this arrangement, when a signal voltage becomes higher than a MAX voltage, the MAX voltage is renewed to be equal to the signal voltage, and when a signal voltage becomes lower than the MIN voltage, the MIN voltage is renewed to be equal to the signal voltage, and the MAX voltage and the MIN voltage are set to have a constant voltage difference. Further, an intermediate voltage between the MAX voltage and the MIN voltage is used as a threshold value level, and the threshold value level is compared with the signal voltage. Thus, in addition to the foregoing effects, it is possible to carry out more precise digitalization, by suppressing influence of amplitude difference between the high frequent component and the low frequent component due to the influence of the filter. Further, even in case of having rapid DC level fluctuation of the input signal, this arrangement is capable of suppressing the influence of the rapid fluctuation, thereby carrying out more precise digitalization.

In addition to the foregoing arrangement, a data slicer according to the present invention further includes an amplitude suppression circuit for being supplied with the demodulated signal, and for reducing amplitude difference between a low frequency component and a high frequency component of the demodulated signal as an input signal; and an offset cancellation section for reducing the input signal supplied to the amplitude suppression circuit so as to cancel an excess voltage from a maximum limit value or a minimum limit value, when a voltage of the demodulated signal as an output signal from the amplitude suppression circuit is greater than the maximum limit value or smaller than the minimum limit value; and is arranged so that the digitalization is carried out according to the polarity of output from the amplitude suppression circuit.

For example, the amplitude difference between a low frequency component and a high frequency component due to the influence of the filter can be reduced by supplying the input signal to the amplitude suppression circuit. Next, when the voltage of an output signal from the amplitude suppression circuit is greater than the maximum limit value or smaller than the minimum limit value, the offset cancellation circuit outputs a value according to the excess voltage of the maximum/minimum limit value. This output from the offset cancellation circuit is integrated and fed back to the input signal voltage to add up with the voltage. The digitalization is carried out according to the polarity of the output from the adder.

Therefore, in addition to the foregoing effects, even in case of having rapid DC level fluctuation of the input signal, it is possible to suppress the influence of the rapid fluctuation, thereby carrying out more precise digitalization.

Additional objects, features, and strengths of the present invention will be made clear by the description below. Further, the advantages of the present invention will be evident from the following explanation in reference to the drawings.

DESCRIPTION OF THE EMBODIMENTS

Figure 18:
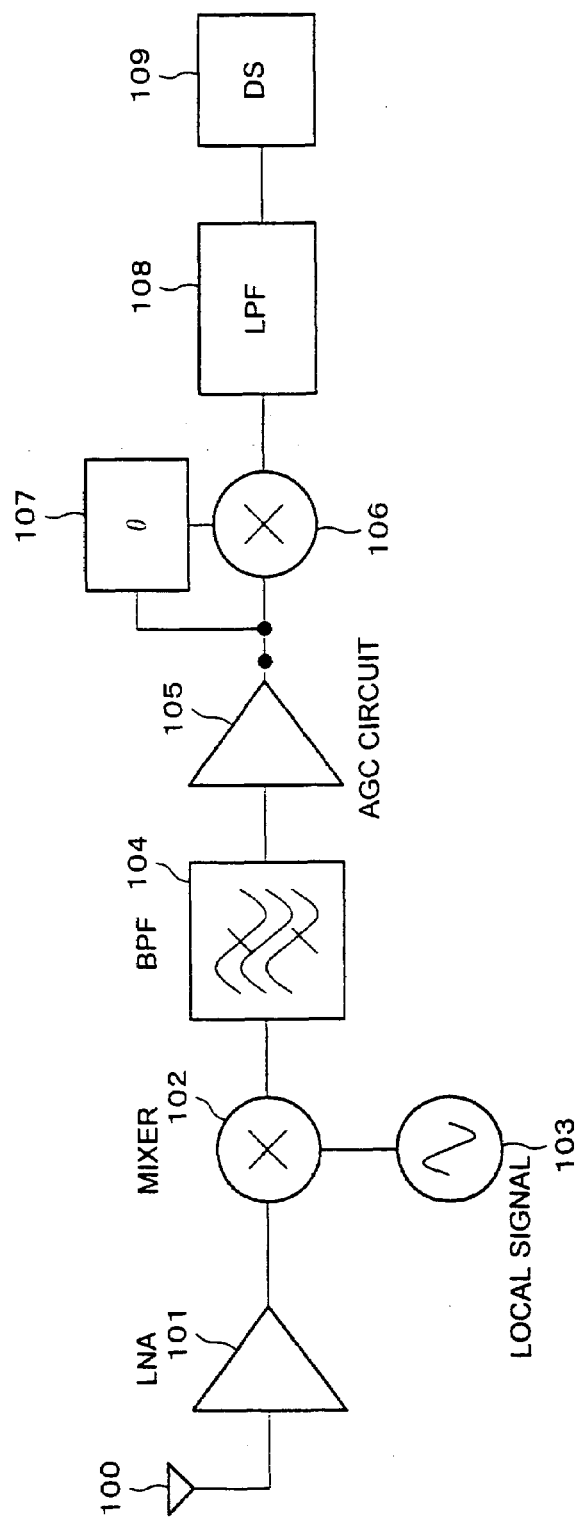
FIG. 18 is a bock diagram showing an arrangement example of a radio receiving circuit.

Firstly, FIG. 18 shows a block diagram showing an example of receiving a radio signal of a modulation mode such as the FSK. An RF signal inputted from an antenna is amplified by a LNA 101. Thereafter, the RF signal is mixed with a local signal 103 in the mixer 102, and then is converted into an IF signal. Frequency components of the IF signal are attenuated except for the desired wave at a BPF (Band pass Filter) 104. After the IF signal is outputted from the BPF, the output amplitude of the IF signal becomes constant through a limiter amp or an AGC circuit 105, before the IF signal is outputted from the amp or the circuit. This output is divided into two, and one is inputted to a demodulation circuit mixer 106, and the other is inputted to a phase circuit 107 so as to rotate the phase by 90°. The output of the phase circuit 107 and the output of the AGC circuit 105 are inputted to the demodulation circuit mixer 106 and then multiplied by each other so as to output an analog demodulation signal. The multiplication generates high frequency signals or carrier components in the analog demodulation signal, and these signals or components are removed by a LPF (Low Pass Filter) 108. This analog demodulation output of the LPF 108 is digitalized in a data slicer circuit 109.

Figure 19:
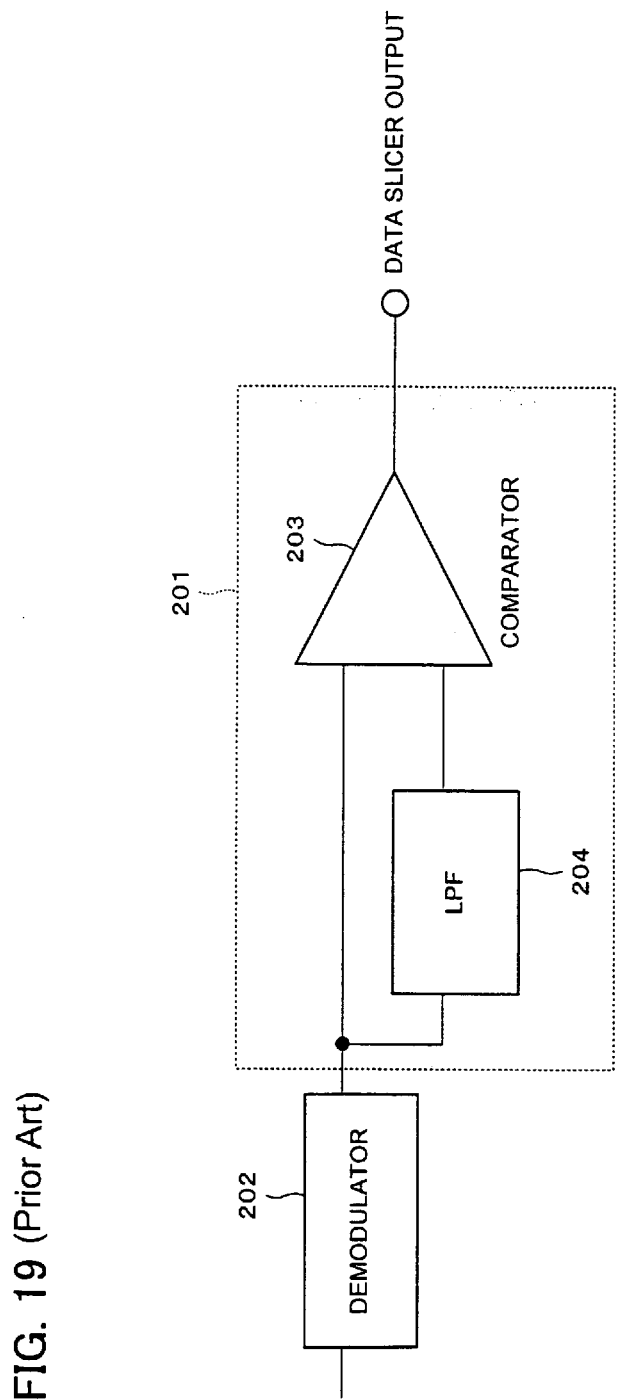
FIG. 19 is a bock diagram showing an arrangement example of a conventional data slicer circuit.

FIG. 19 shows an example of a conventional data slicer circuit using an integration circuit. A demodulated signal outputted from a demodulator 202 is divided into two, and one is inputted to a comparator 203, and the other is inputted to the LPF 204 so as to remove an AC component so that only a DC component is outputted. This output from the LPF is connected to the other input end of the comparator 203. The comparator 203 digitalizes the demodulated signal by carrying out voltage comparison between the demodulated signal and the DC voltage component of the demodulated signal.

Figure 20:
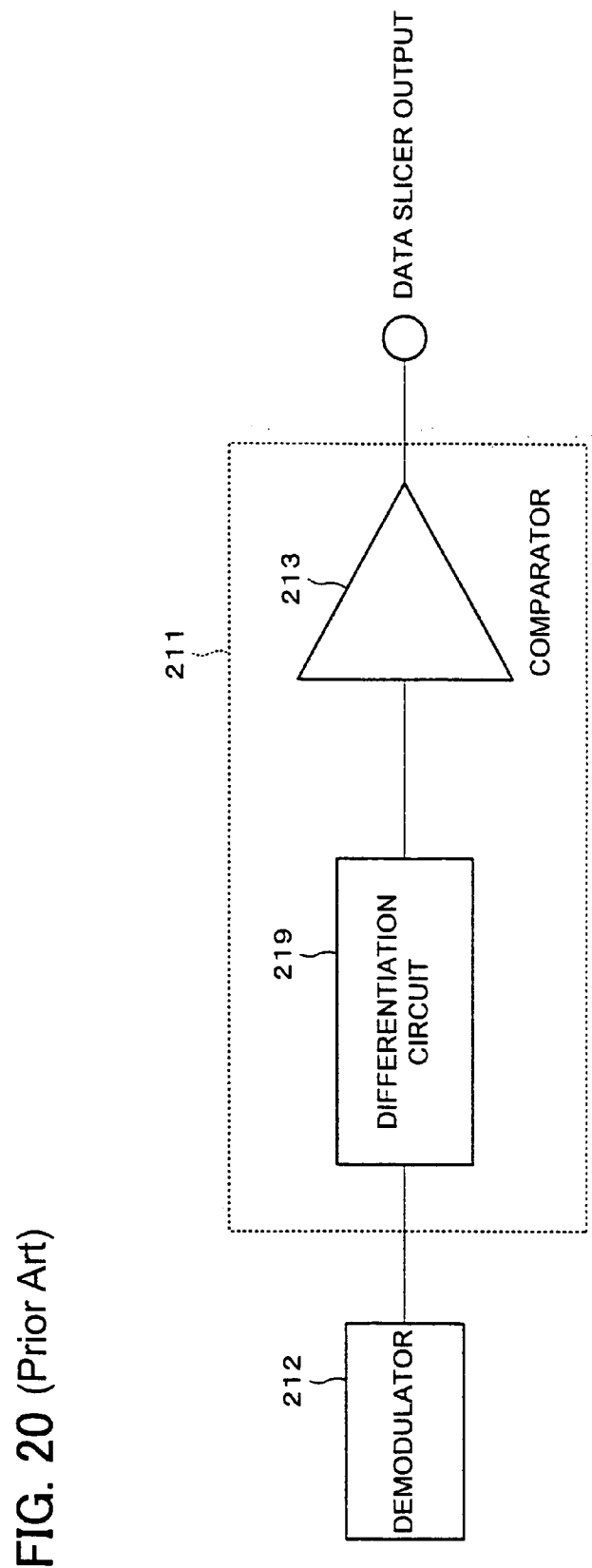
FIG. 20 is a bock diagram showing an arrangement example of a conventional data slicer circuit.

FIG. 20 is an example of a conventional data slicer circuit including a differentiation circuit. A signal outputted from a demodulator 212 is inputted to a differentiation circuit 219, and the differentiation circuit 219 outputs a signal of either plus or minus polarity, which is then inputted to a comparator, so as to carry out digitalization.

Figure 21:
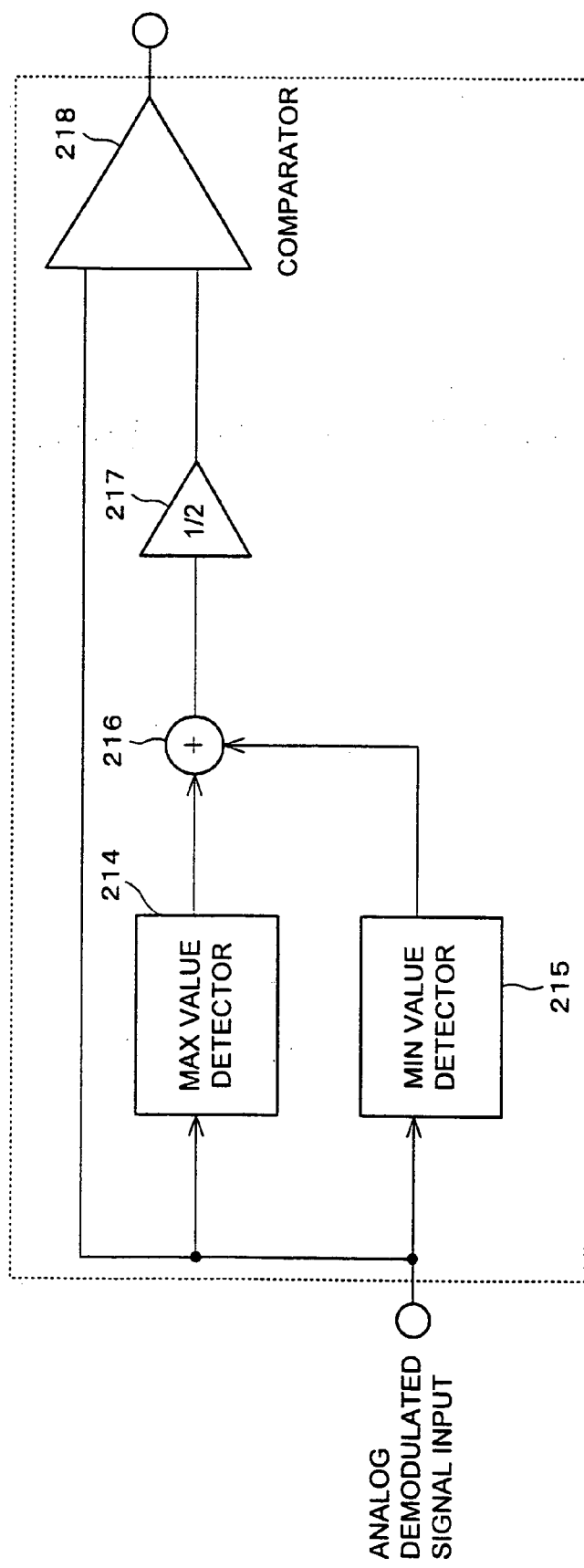
FIG. 21 is a bock diagram showing an arrangement example of a conventional data slicer circuit.

FIG. 21 shows an example of a conventional data slicer circuit using the MAX hold value and the MIN hold value of a demodulated signal. The demodulation signal stores a maximum peak value at a MAX value detection circuit 214, and stores a minimum peak value at a MIN value detection circuit 215. These peak values are added to each other in an addition circuit 216, and the result is then halved in an amp 217. Thereafter, the amp 217 outputs a value of (MAX peak+MIN peak)/2, which is inputted to a comparator 218. The comparator 218 carries out digitalization by comparing the level of the output of the amp 217 and the voltage of the demodulated signal.

There exists unsynchronized standby states in radio communication protocol, such as time just after power-up of a receiving end. In such a standby state, the receiving end cannot predict the signal output timing of a sending end. Further, in the head of packet data used in radio communication, there is data called preamble used for digitalization. However, in some radio communication protocols, the data includes so little preamble that it seldom works as preamble. For carrying out sending and receiving under such a condition, it is necessary to receive a ring signal, and under this circumstance, three capabilities are required of a data slicer.
(1) The slice level needs follow rapid drift of signal level.
(2) The slice level must not follow a sequence of [1] bits or [0] bits.
(3) The BER (Bit Error Rate) should have little influence by noise.

Figure 22:
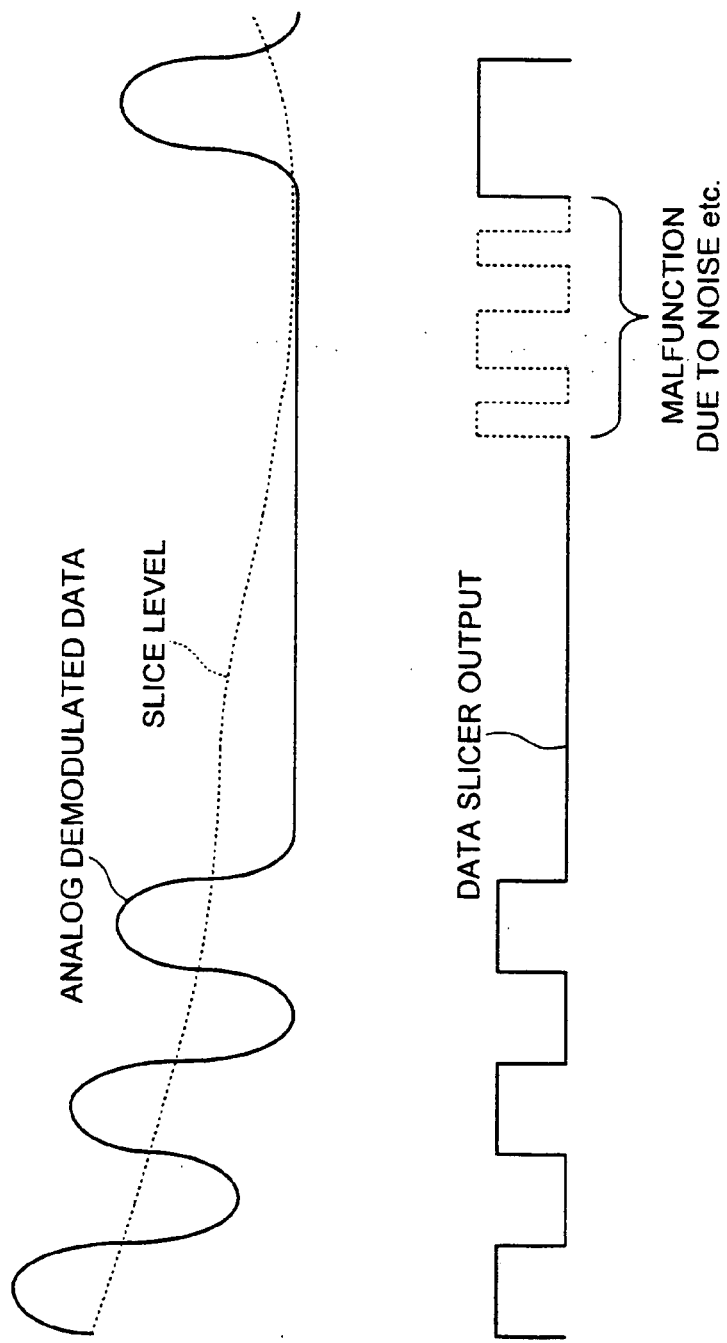
FIG. 22 is a drawing showing an example of operation of a conventional data slicer.
Figure 23:
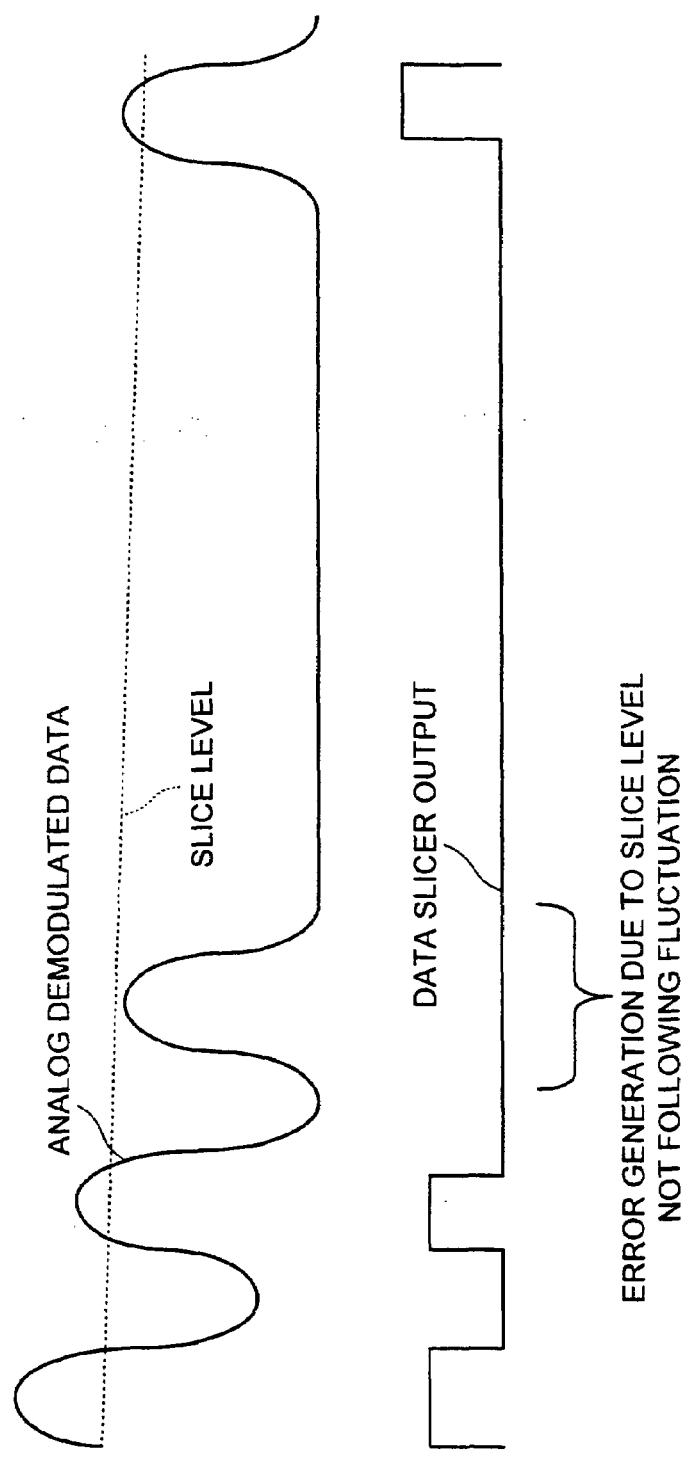
FIG. 23 is a drawing showing an example of operation of a conventional data slicer.

When the conventional data slicer shown in FIG. 19 is designed so that the slice level greatly follows a low frequency component, it also can follow rapid change of DC component; however, in case of having a long period of the sequence of [1] bits or the sequence of [0] bits, these sequences of bits are considered as a low frequency component and the slice level greatly follows these continuous bits as shown in FIG. 22. This brings about great influence of noise, thereby worsening the BER. On the other hand, when the data slicer is designed so that its slice level slightly follows a low frequency component, it is not likely to be influenced by noise, and therefore possible to obtaining a better BER; however, in such a case, it is necessary to accurately detect the DC voltage of a signal. In detection of the DC voltage, there arises such a problem that there is a difference in the DC level of a demodulator between a case where a signal is inputted to the demodulator, and a case where a signal is not inputted to the demodulator. Therefore, in a time divisional sending/receiving manner such as the TDMA (Time Division Multiple Access) mode or the FH hopping mode, there occurs drastic fluctuation of the DC level outputted from the demodulator depending on whether or not a signal is inputted to the demodulator. When the data slicer is designed so that the slice level slightly follows a low frequency component, the slice level cannot be set as an optimal value as shown in FIG. 23, thus failing to accurately carry out digitalization.

Figure 24:
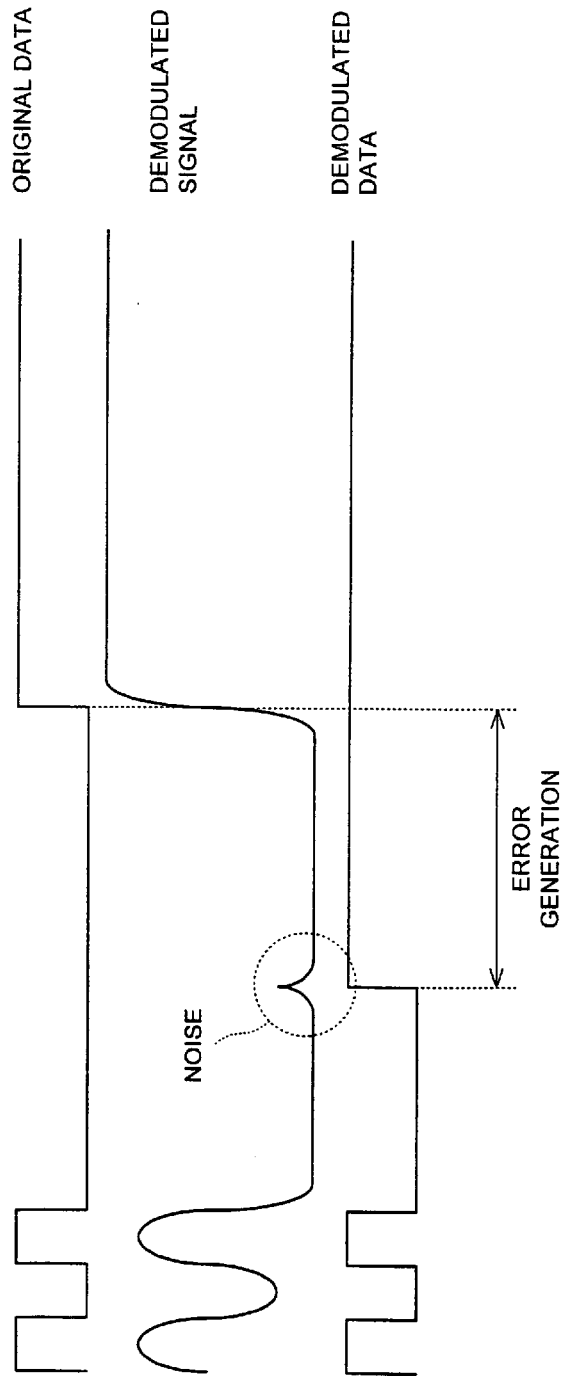
FIG. 24 is a drawing showing an example of operation of a conventional data slicer.

In a method of carrying out digitalization according to the polarity of inclination of signal voltage fluctuation by using a differential circuit, as with a data slicer shown in FIG. 20, it is possible to satisfy the foregoing conditions (1) and (2) by using a hysteresis comparator and setting the slicer, for example, so that digitalization is carried out on condition that voltage fluctuation quantity of the demodulated signal becomes at or greater than a certain value. However, this method is greatly influenced by noise. For example, as shown in FIG. 24, when an error occurs due to the influence of noise during the digitalization of a continuous [1] bit or a continuous [0] bit, the outputs of the rest of continuous [1] bits or continuous [0] bits are inversed, and this condition maintains until the next inversion of [1] and [2] of the input data, thereby worsening the BER.

Figure 25:
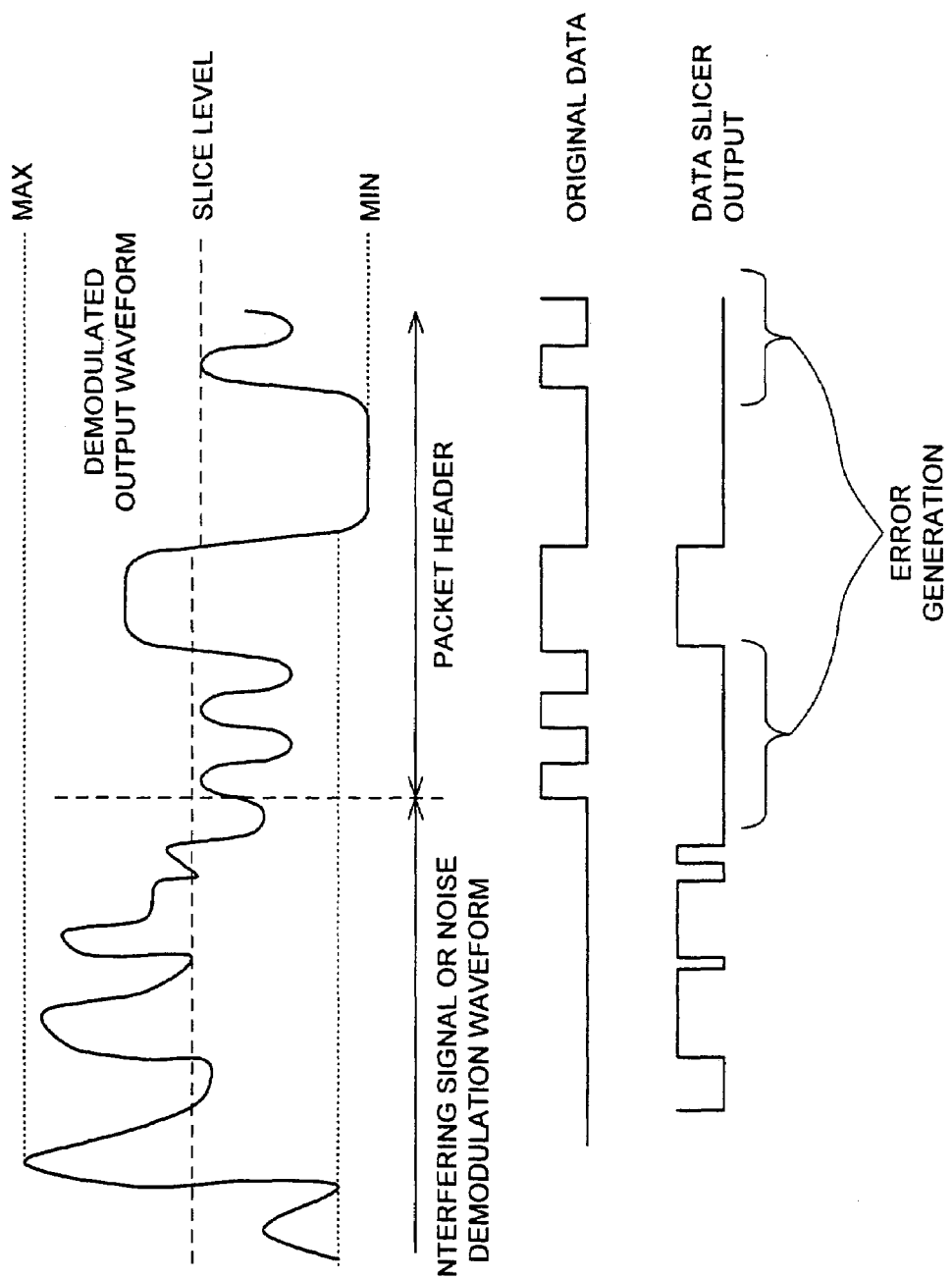
FIG. 25 is a drawing showing an example of operation of a conventional data slicer.

In the method of storing the MAX value and the MIN value of a signal, as with the data slicer shown in FIG. 21, it is possible to satisfy the foregoing conditions (1), (2) and (3); however, problems may arise when used in connection with radio communications. A first problem is that a radio receiver includes a channel selection filter or a LPF after demodulation, and the frequency property causes difference in demodulation amplitude between the high frequency component and the low frequency component of the demodulated signal; otherwise, a LPF in the sending signal end provided for transmission spurious suppression causes difference in demodulation amplitude between the high frequency component and the low frequency component of the demodulated signal, thereby failing to obtain an originally required threshold. For example, when the demodulated signal firstly includes a high frequency component such as [1010], and then includes a low frequency component such as [1111], the MIN hold value is equal to the MIN voltage value of the high frequency component, and the MAX hold value is equal to the MAX voltage value of the low frequency component. In case of setting an intermediate voltage between the MIN hold value and the MAX hold value as the threshold value, it will be slightly different from the originally required threshold voltage. Thus, it may cause an error if digitalization of demodulation data of the high frequency component is carried out with this threshold value. Further, a second problem is receipt of an interfering signal such as an adjacent channel before the receipt of a desired signal. This brings about failure of obtaining the originally required threshold value. The DC voltage of the demodulated signal in case of receiving the adjacent channel interfering signal defers from the case of receiving a desired wave. Therefore, when carrying out MAX holding or MiN holding during the receipt of the adjacent channel interfering signal, the obtained threshold becomes different from the originally required threshold value. Thus, it may cause an error if this threshold is used for digitalization of demodulated data of the high frequency component (see FIG. 25).

To solve these problems, in the conventional technology, a data slicer with desirable accuracy has been realized by determining the slice level during the preamble period, and thereafter setting the determined slice level and the input signal DC level as fixed values. However, this method requires secure capturing for only the preamble. It is possible to predict the timing of preamble input if the sending end and the receiving end are totally in synchronism with each other; however, in the standby state, the timing cannot be predicted, as the rending end and the receiving end are not in synchronism with each other. Further, more difficulty occurs if only a short period is provided for preamble.

In order to solve this problem, there has been a method of providing means for detecting input signal level so as to predict the timing based on the signal detection output. However, when the level of the adjacent channel interfering signal coming to the signal detection circuit is greater than the minimum receiving level of the desired signal, it causes malfunction of the signal detection circuit due to the adjacent channel interfering signal, thus failing to judge the input timing of the desired signal.

Figure 1:
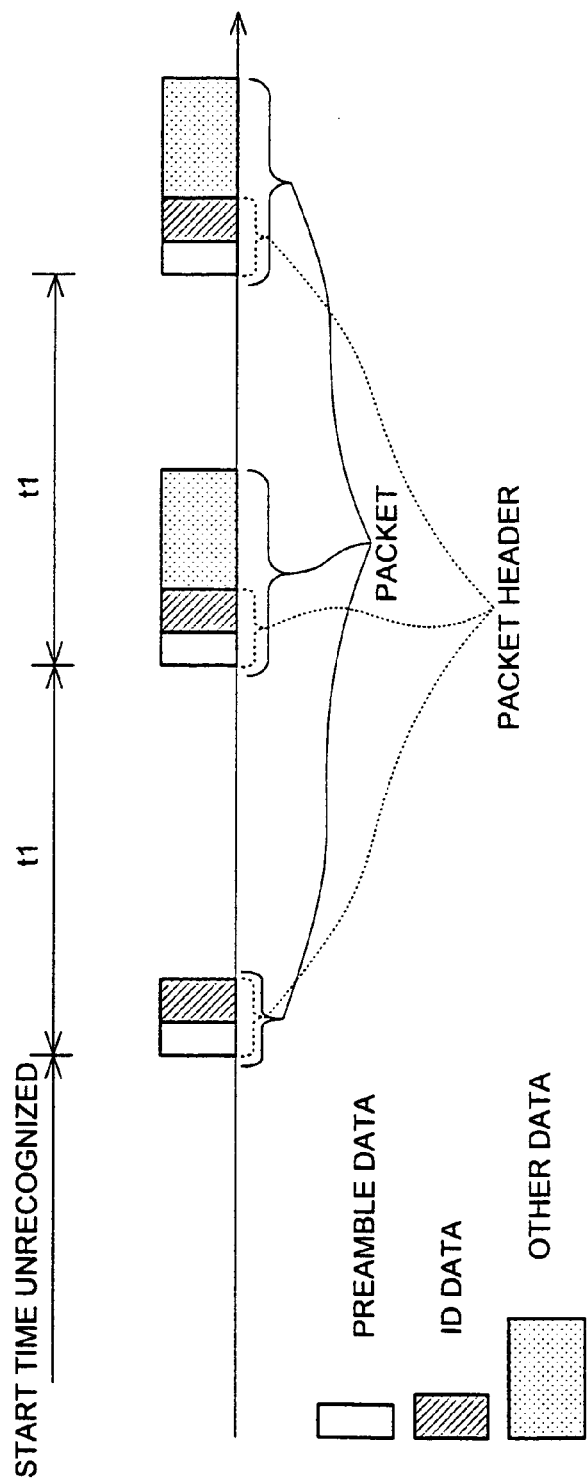
FIG. 1 is a drawing showing an example of packet data.

Next, FIG. 1 is an example of input packet data according to the present invention. The packet data is made up of preamble data, superposed ID data and other data. The packet header is constituted of the preamble data followed by ID data. The same predetermined data is repeated in the ID data, and this ID data is provided for specifying the sending end. The other data includes concrete communication contents.

The packet data sent from the sending end at an unsynchronized condition, such as time just after the power-up of the receiving end, only includes the preamble data and the ID data. When the ID of a sending end signal is recognized in the receiving end, the sending timing of the sending end can be found out, and the operation timing of the receiving end is adjusted to be synchronized with the sending end. Though it is not shown in the figure, the receiving end sends a signal to the sending end after receipt of the ID so as to inform that the receiving end has received the packet data. Upon receipt of this signal in the sending end, the sending end and the receiving end are synchronized with each other. After establishment of the synchronization, the sending/receiving of the packet data is performed at certain time intervals.

Figure 2:
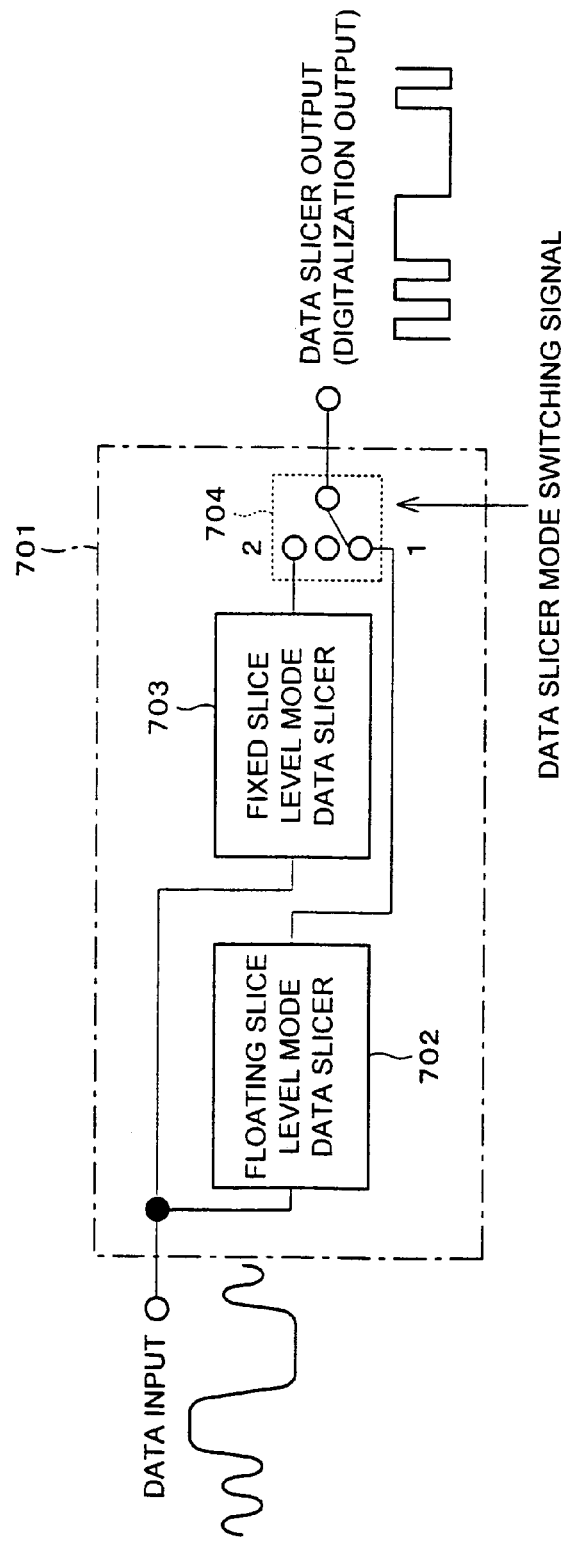
FIG. 2 is a block diagram showing an arrangement example of a data slicer.
Figure 3:
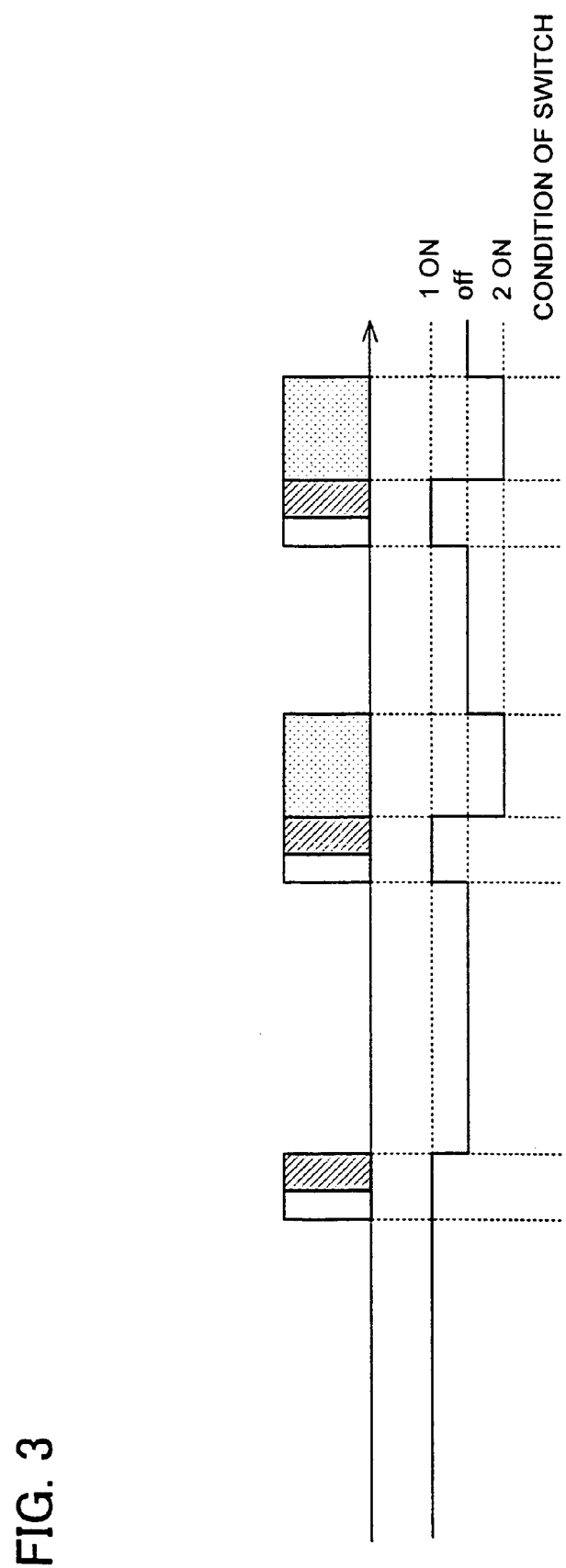
FIG. 3 is a drawing showing an example of switching operation of a data slicer.

FIG. 2 shows a data slicer 701 as an example of a data slicer according to the present invention. The data slicer 701 includes a floating slice level mode data slicer 702, a fixed slice level mode data slicer 703, and a switch 704. A signal, which has been demodulated in a demodulation circuit (not shown), is inputted to the floating slice level mode data slicer 702 and the fixed slice level mode data slicer 703. As shown in FIG. 3, the switch 704 used for selecting output of the data slicer turns to select a digitalization- output result of a floating data slicing method, with respect to the packet header, and to select a digitalization output result of a fixed data slicing method, with respect to the other part of the packet data.

Figure 4:
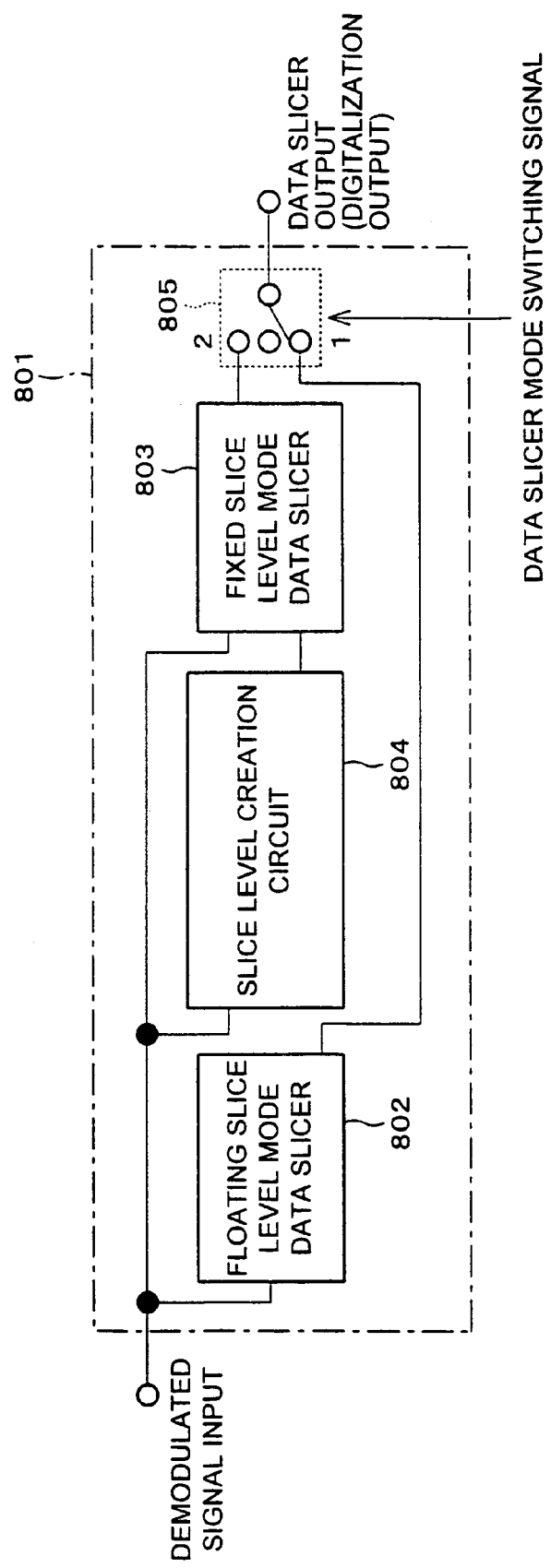
FIG. 4 is a block diagram showing an arrangement example of a data slicer.

FIG. 4 shows a data slicer 801 as an example of a data slicer according to the present invention. The data slicer 801 includes a floating slice level mode data slicer 802, a fixed slice level mode data slicer 803, a slice level creation circuit 804, and a switch 805. A signal, which has been demodulated in a demodulation circuit, is divided into three, and then are respectively inputted to the floating slice level mode data slicer 802, the fixed slice level mode data slicer 803, and the slice level creation circuit 804. The slice level creation circuit 804 creates a threshold value by using a demodulated signal of the packet header. This threshold value is used as the default threshold of the fixed slice level mode data slicer 803. The switch 805 for selecting output of the data slicer turns to select a digitalization output result of a floating data slicing method, with respect to the packet header, and select a digitalization output result of a fixed data slicing method, with respect to the other part of the packet data.

The slice level creation circuit 804 may include a default threshold creation circuit for creating the foregoing default threshold. The following will describe a concrete example of this arrangement.

Figure 5:
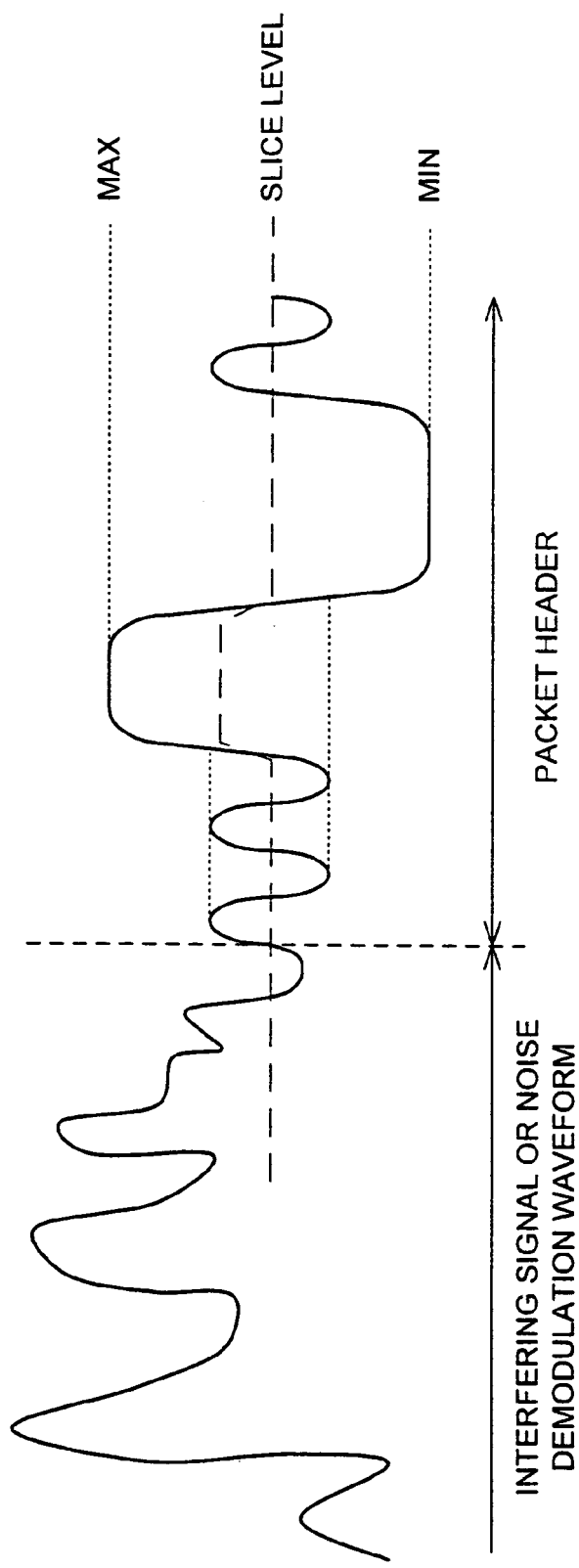
FIG. 5 is an explanatory view showing operation of a default threshold creation circuit.

FIG. 5 is an explanatory view showing operation of an example of the default threshold creation circuit used for a data slicer according to the present invention. To create the slice level, the MAX (Maximum value) hold value and the MIN (Minimum value) hold value of demodulation data in the packet header are stored, and also these hold values are renewed when a value of out of the range from the MAX hold value to the MIN hold values is inputted. By determining the threshold at the middle point between the MAX hold value and the MIN hold value, it is possible to obtain highly-accurate slice level.

Figure 6:
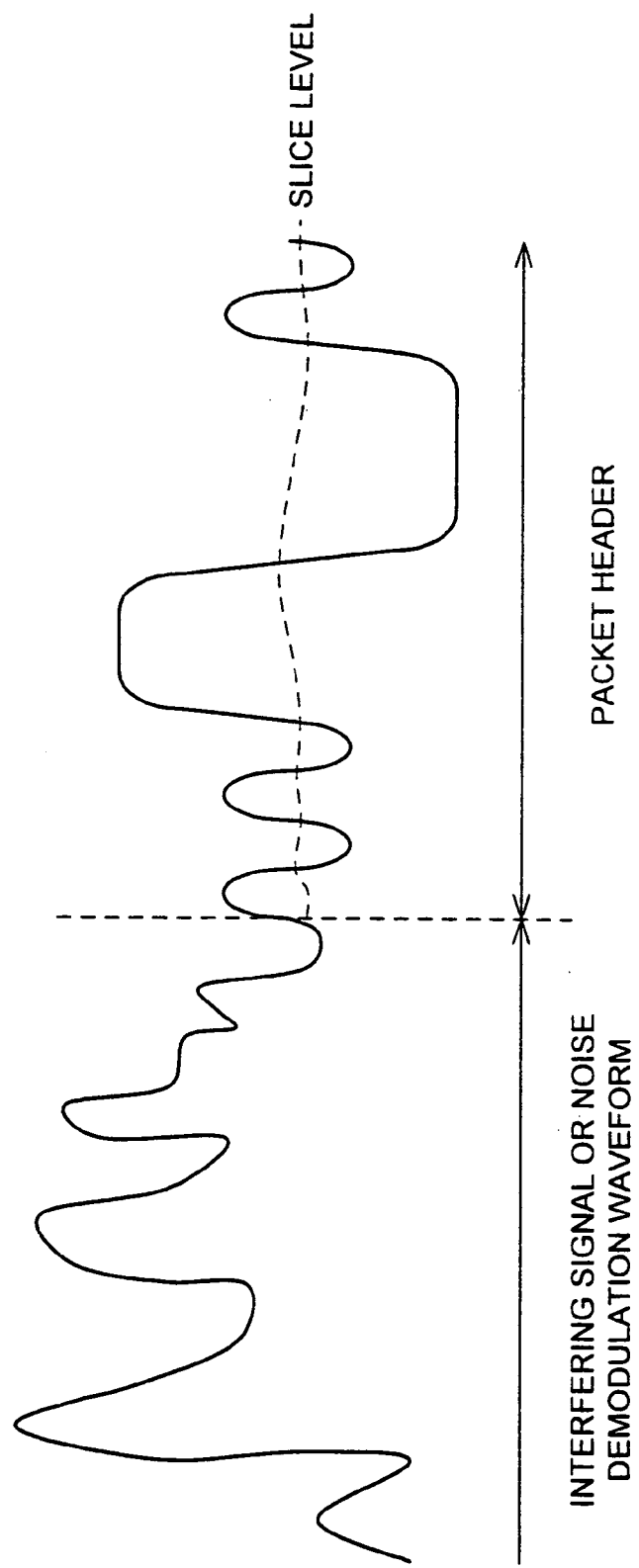
FIG. 6 is an explanatory view showing operation of a default threshold creation circuit.

FIG. 6 is an explanatory view showing operation of an example of the default threshold creation circuit used for a data slicer according to the present invention. In this example, the slice level is obtained by integrating demodulation data in the packet header. This effect can also be obtained by attenuating an AC component by using a LPF (Low Pass Filter).

Figure 7:
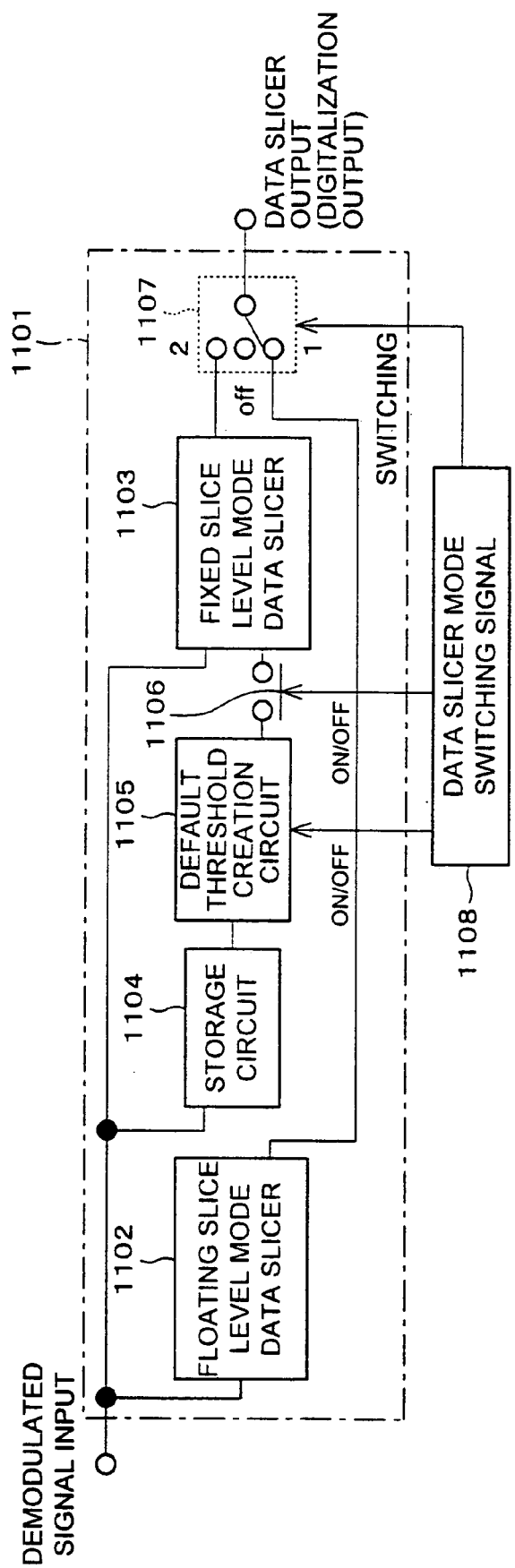
FIG. 7 is a block diagram showing an arrangement example of a data slicer.

FIG. 7 shows an example of a data slicer according to the present invention. A data slicer 1101 includes a floating slice level mode data slicer 1102, a fixed slice level mode data slicer 1103, a storage circuit 1104, a default threshold creation circuit 1105, a switch 1106, and a switch 1107. In the data slicer 1101, a demodulated signal is divided into three, and respectively connected to the floating slice level mode data slicer 1102, the storage circuit (shift register) 1104, and the fixed slice level mode data slicer 1103. The storage circuit 1104 is constituted to be like a shift register, and carries out its operation so that the input data are sequentially stored, and when the amount of input data excesses a certain level, old data are sequentially deleted. The default threshold creation circuit 1105 reads data in the storage circuit 1104 so as to figure out the threshold value.

When a demodulated signal is inputted to the data slicer 1101, digitalization is carried out in the floating slice level mode data slicer 1102 in a standby state or in the packet header. Then, when the digitalization of the packet header is finished, a data slicer mode switching signal 1108 operates a default threshold creation circuit 1105, which generates a signal for turning on the switch 1106 and for turning the switch 1107 to 2-side in the figure. Here, the storage circuit 1104 only stores demodulation data for the packet header. This data is used for creating a default threshold, which is determined as a default slice level of the fixed slice level mode data slicer 1103. In this manner, it is possible to carry out digitalization by the fixed slice level mode data slicer 1103 with respect to all data after the packet header.

Figure 8:
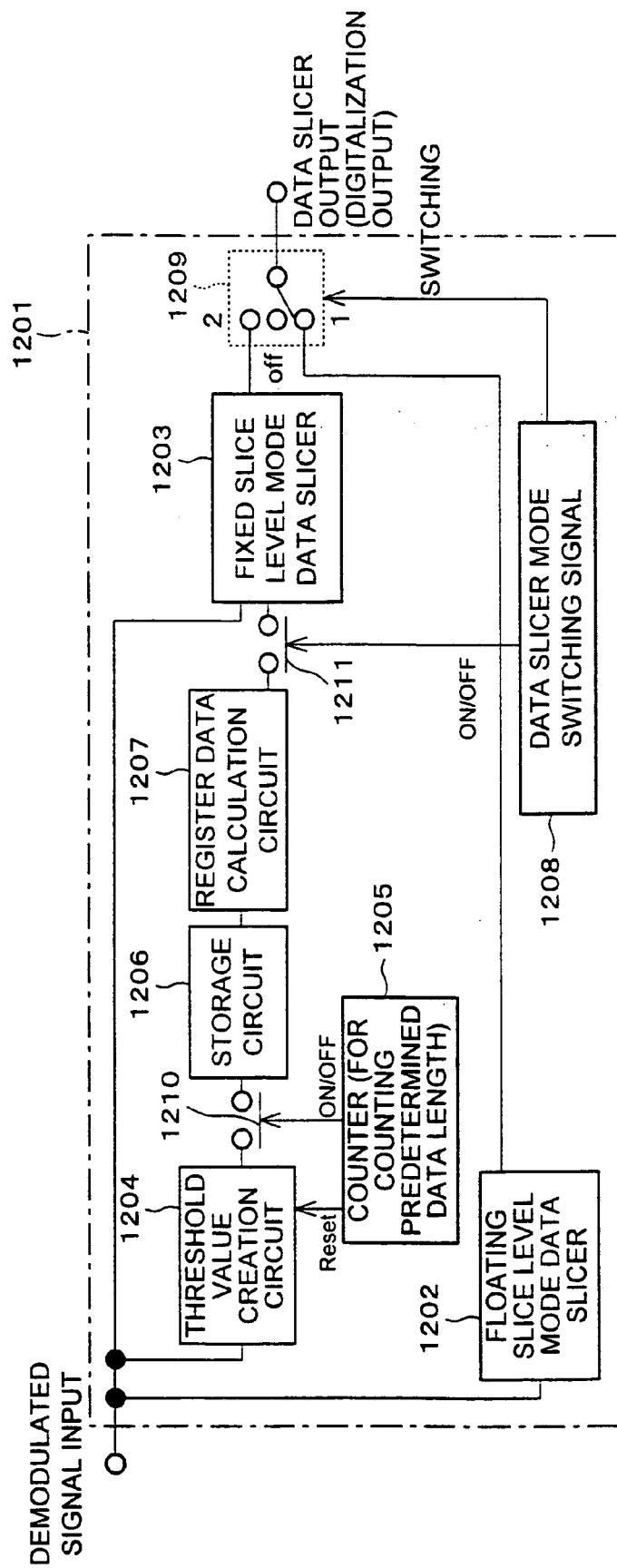
FIG. 8 is a block diagram showing an arrangement example of a data slicer.

FIG. 8 is a block diagram showing an example of a data slicer according to the present invention. A data slicer 1201 includes a floating slice level mode data slicer 1202, a fixed slice level mode data slicer 1203, a threshold value creation circuit 1204, a counter 1205, a storage circuit 1206, a register data calculation circuit 1207, and a switch 1209. In the data slicer 1201, the threshold value creation circuit 1204 receives a demodulated signal, and outputs threshold value data. The counter 1205 resets the threshold value creation circuit 1204 at predetermined time intervals. The switch 1210 is turned on just before the resetting of the threshold value creation circuit 1204, and therefore the threshold value data is stored in the storage circuit 1206. Accordingly, the storage circuit 1206 stores the threshold value data for each of predetermined times, which are decided by the counter 1205. The storage circuit 1206 has a configuration of a shift register, and the storable data amount therein can be found by:

(data of the packet header)÷(number of data processed in the time of the counter).

The register data calculation circuit 1207 carries out calculation only with respect to data stored in the storage circuit 1206, and outputs a result of threshold value calculation. The switch 1211 turns on when the data slicer mode switching signal 1208 is outputted, and the threshold value is inputted to the fixed slice level mode data slicer 1203 as a default threshold value. Here, the storage circuit 1206 stores data of the threshold value figured out based on demodulation data of the packet header. Further, since the switch 1209 for switching the output of the data slicer is turned by the data slicer mode switching signal 1208, digitalization can be carried out by the fixed slice level mode data slicer 1203 with respect to all data after the packet header.

Figure 9:
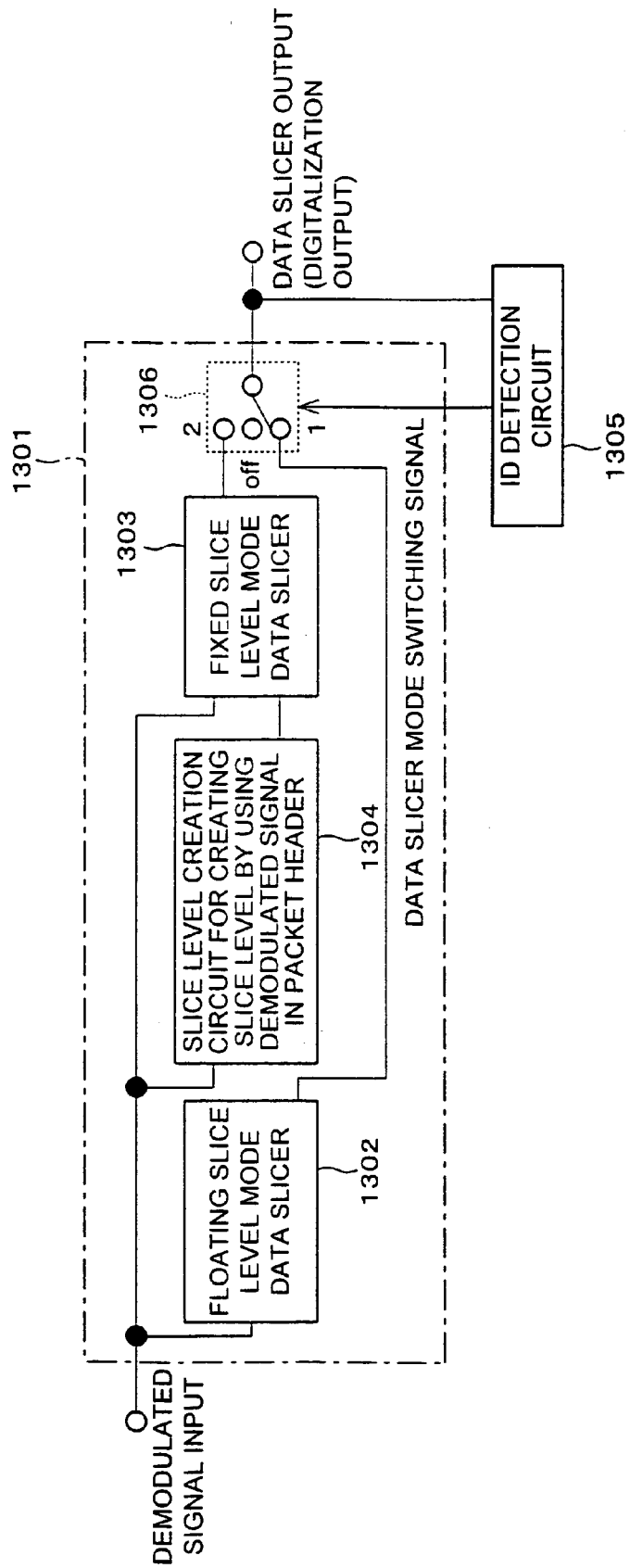
FIG. 9 is a block diagram showing an arrangement example of a data slicer.
Figure 10:
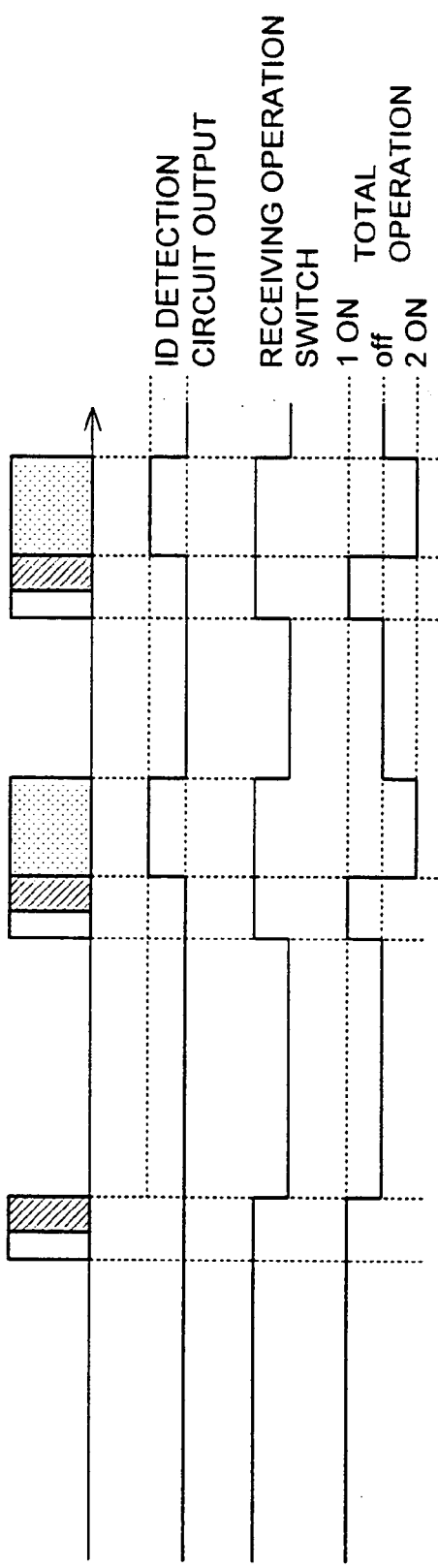
FIG. 10 is a drawing showing an example of switching operation of the data slicer shown in FIG. 9.

FIG. 9 shows a block diagram showing an example of switching means for selecting slicing methods according to the present invention. A data slicer 1301 includes a floating slice level mode data slicer 1302, a fixed slice level mode data slicer 1303, a slice level creation circuit 1304, and a switch 1306. In the data slicer 1301, which is similar to the data slicer 801 (see FIG. 4), a demodulated signal is connected/inputted to the floating slice level mode data slicer 1302, the slice level creation circuit 1304, and a fixed slice level mode data slicer 1303. At first, the switch 1306 for selecting the output of the data slicer selects side-1 of the figure. An ID detection circuit 1305 always observes output of the data slicer 1301, and controls the switch 1306 for selecting the output of the data slicer so that the switch selects side-2 when data that may be considered ID data is outputted. With this operation, the slicing method can be switched between the packet header and other packet data. FIG. 10 shows an explanatory view of the operation.

Figure 11:
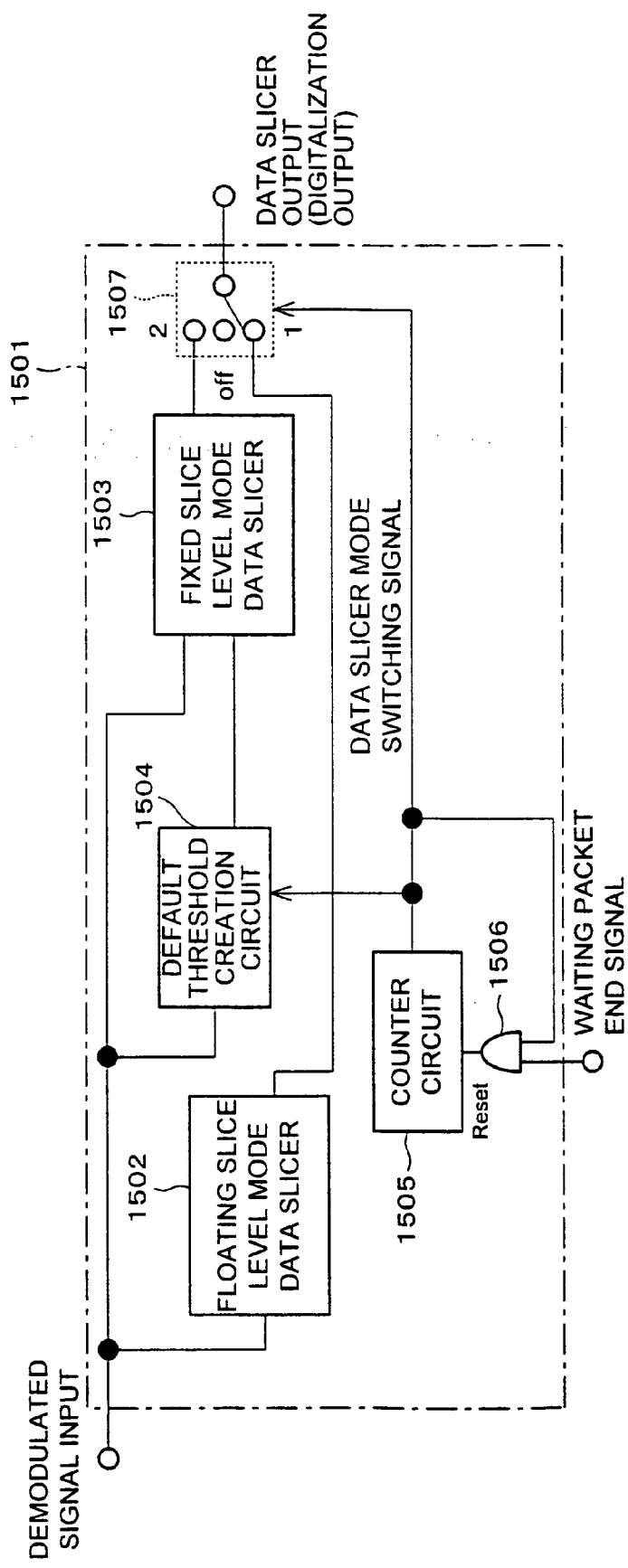
FIG. 11 is a block diagram showing an arrangement example of a data slicer.
Figure 12:
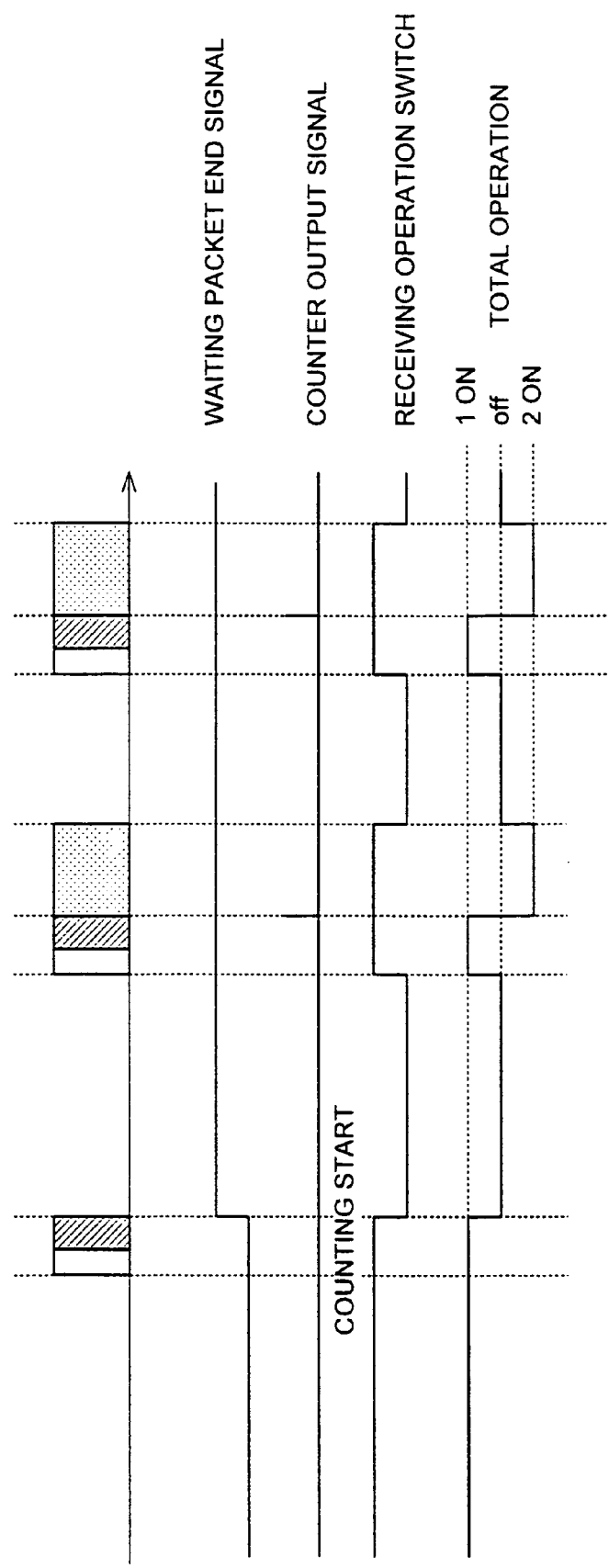
FIG. 12 is a drawing showing an example of switching operation of the data slicer shown in FIG. 11.

FIG. 11 shows a block diagram showing an example of switching means for selecting slicing methods according to the present invention. The data slicer 1501 includes a floating slice level mode data slicer 1502, a fixed slice level mode data slicer 1503, a default threshold creation circuit 1504, a counter circuit (packet header time storing section) 1505, an AND circuit 1506, and a switch 1507. The counter circuit 1505 starts its operation when the standby state is finished, and is reset at determined time intervals. Here, if this time interval is determined to be identical to the time consumed for the sending of the packet header, the counter circuit 1505 is reset at each time that the packet header is finished. By carrying out switching of data slicer modes in the switch 1507 at this reset timing, the slicing method can be switched between the packet header and other packet data. FIG. 12 shows an explanatory view of the operation.

Figure 13:
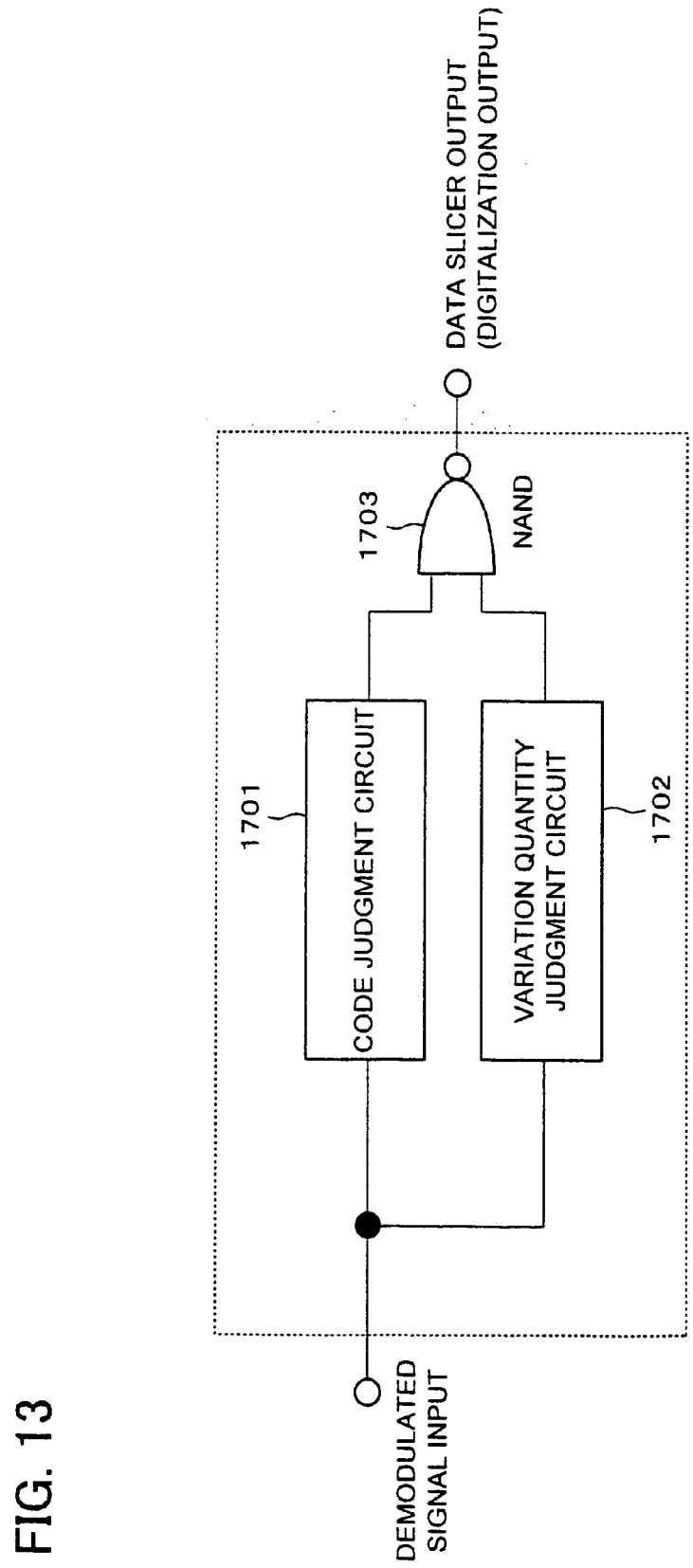
FIG. 13 is a block diagram showing an arrangement example of a floating slice level mode data slicer.
Figure 14:
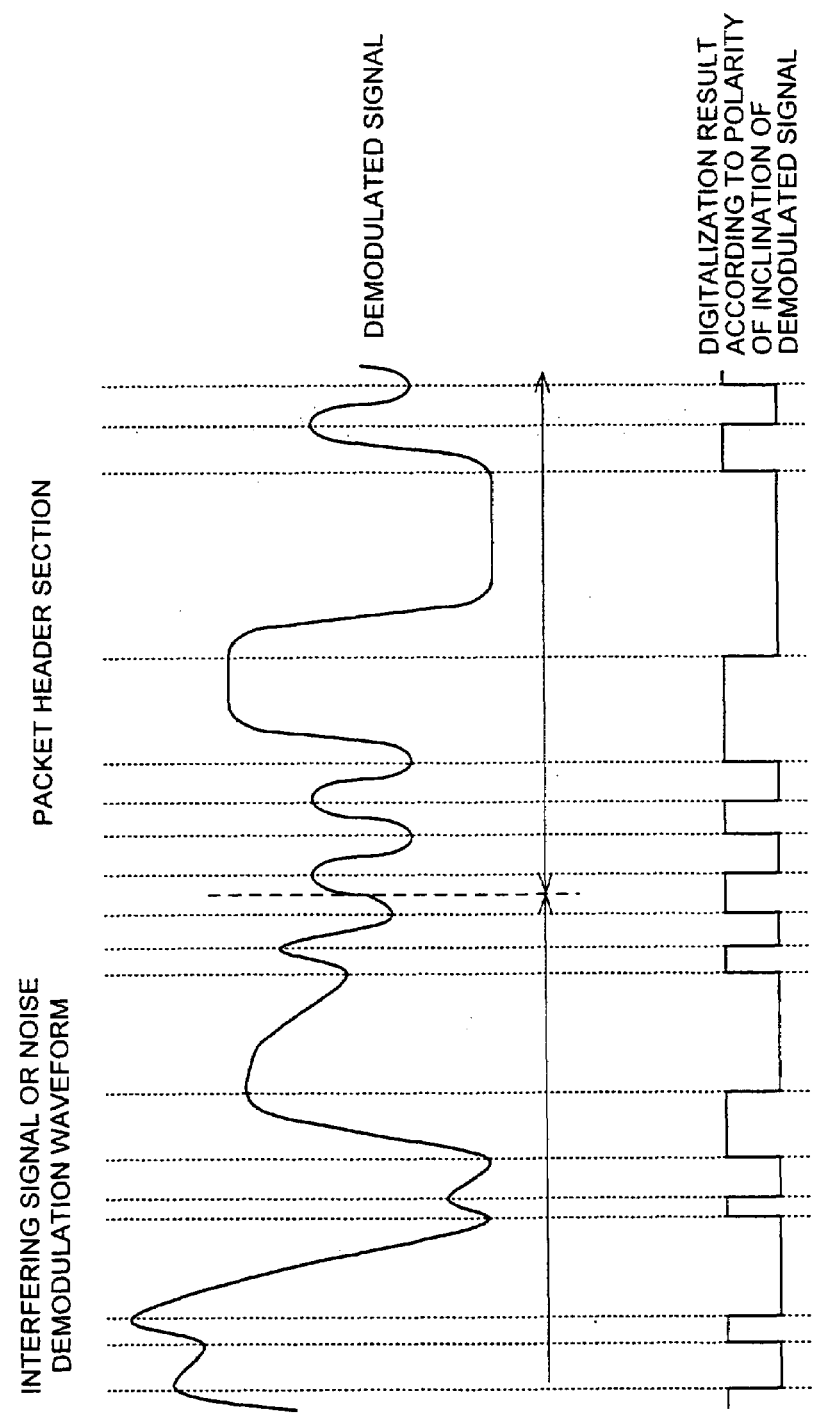
FIG. 14 is a drawing showing an example of operation of the floating slice level mode data slicer shown in FIG. 13.

FIG. 13 shows a block diagram showing a floating slice level data slicer circuit of a data slicer according to the present invention. In this example, a demodulated signal is inputted to a polarity judgment circuit 1701 and a fluctuation quantity judgment circuit 1702. The fluctuation quantity judgment circuit 1702 outputs H (High) when the output of the demodulated signal varies by a certain value or greater. The polarity judgment circuit 1701 outputs either H or L (Low) according to the polarity of inclination of the signal fluctuation. These outputs of the polarity judgment circuit 1701 and the fluctuation quantity judgment circuit 1702 are inputted to a NAND circuit 1703 so as to carry out digitalization. FIG. 14 shows a view of the operation.

Figure 15:
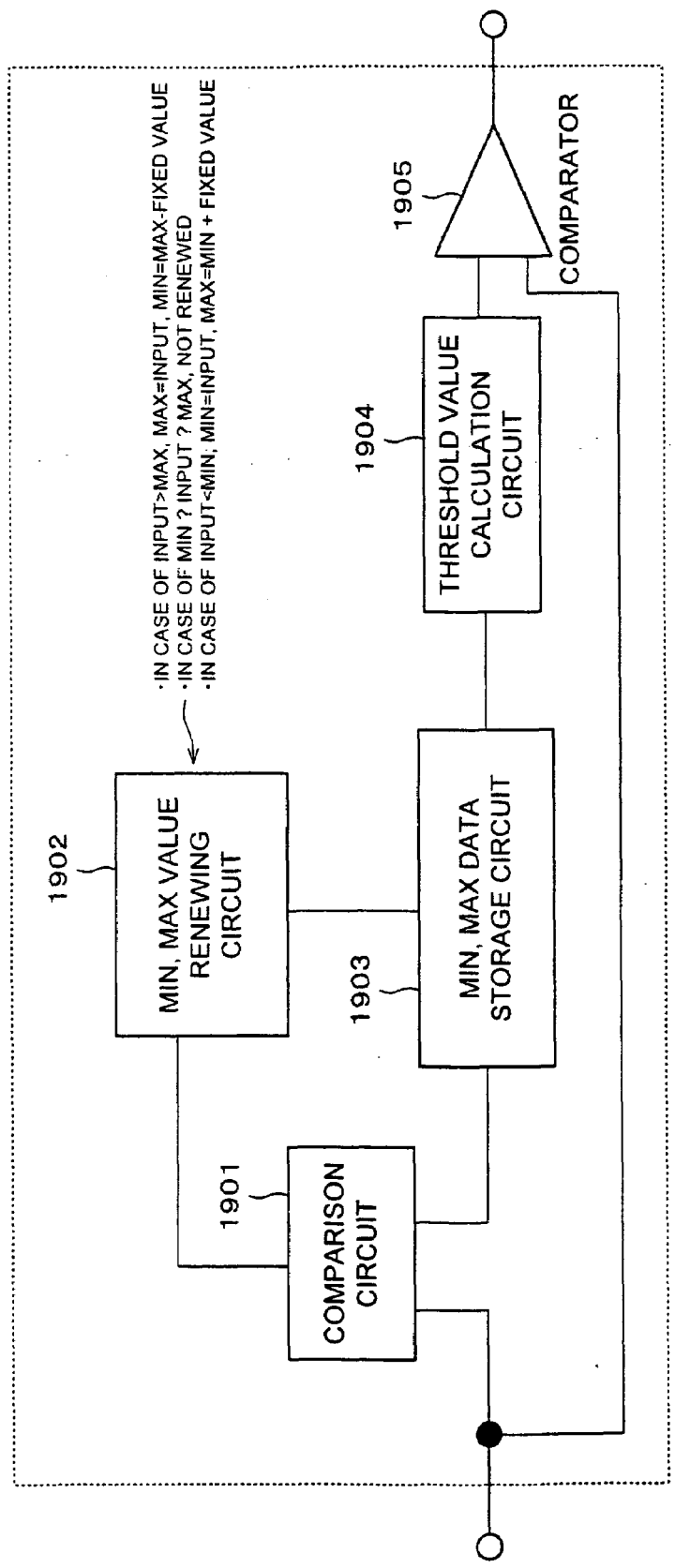
FIG. 15 is a block diagram showing an arrangement example of a floating slice level mode data slicer.

FIG. 15 shows a block diagram showing a floating slice level data slicer circuit of a data slicer according to the present invention. In this example, a demodulated signal is inputted to a comparison circuit 1901 and a comparator 1905. A comparison circuit 1901 compares the MIN value and the MAX value stored in a MIN and MAX data storing circuit 1903 with an input signal voltage. The result of the comparison is inputted to a MIN and MAX values renewing circuit 1902. The MIN and MAX values renewing circuit 1902 carries out operation with three different patterns according to the results from the comparison circuit 1901.

(1) in case where input voltage>MAX value: the MAX value is renewed to be the value of the input voltage, and the MIN value is determined by subtracting an arbitrary fixed value from the MAX value.

(2) in case where MIN value≦input voltage≦MAX value: the MIN value and the MAX value are not renewed.

(3) in case where input voltage<MAX value: the MAX value is renewed to be the value of the input voltage, and the MIN value is determined by adding an arbitrary fixed value to the MIN value.

The MIN and MAX values renewing circuit 1902 inputs the renewed MIN value and the MAX value to the MIN and MAX data storing circuit 1903. This MIN and MAX values are inputted to a threshold value calculation circuit 1903. The threshold value calculation circuit 1903 uses the MIN and MAX values so as to carry out calculation according to the following equation, for example.

threshold value=(MIN+MAX)/2

Figure 16:
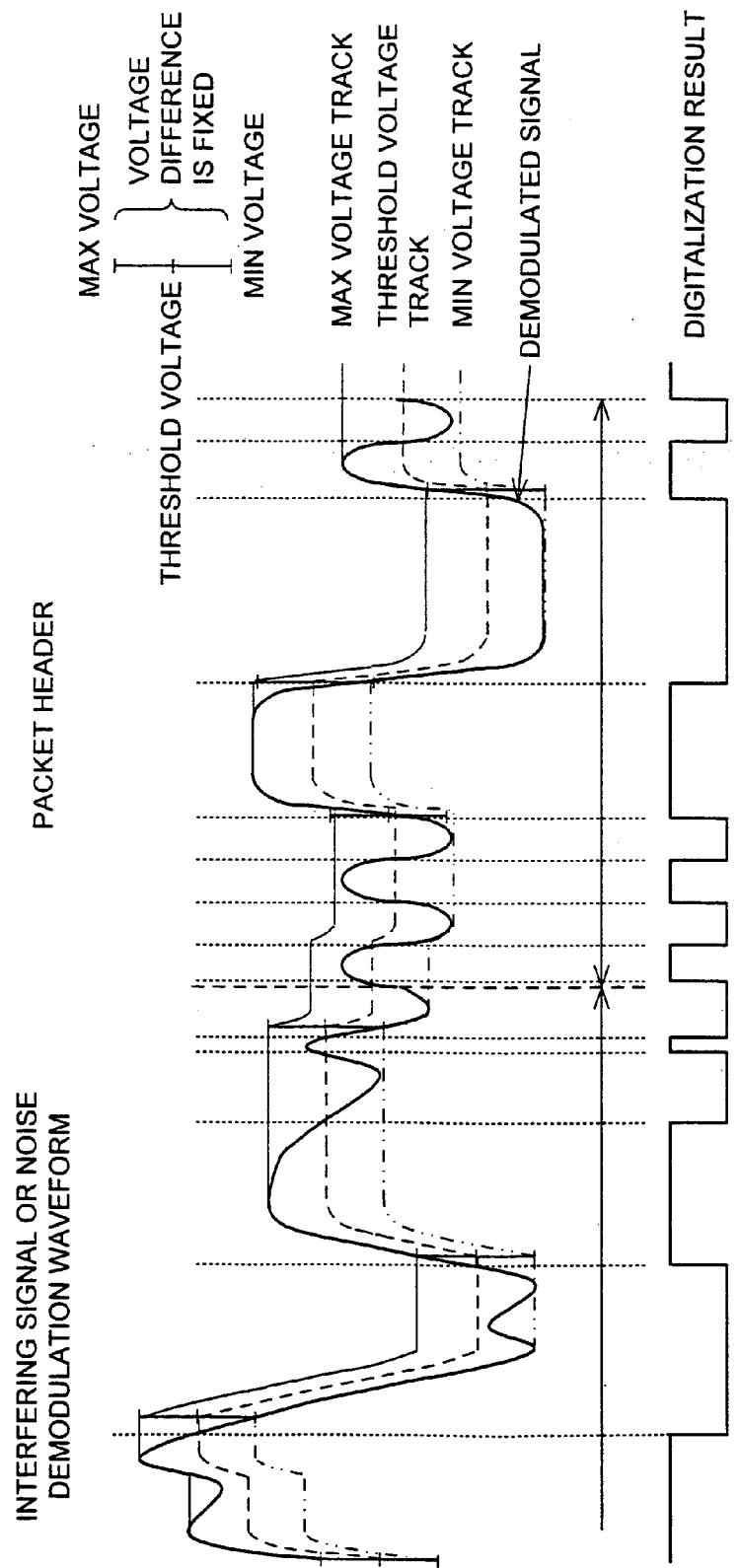
FIG. 16 is a drawing showing an example of operation of the floating slice level mode data slicer shown in FIG. 15.

The threshold value as a result of the calculation is inputted to a comparator 1905. The comparator 1905 compares the voltages of the threshold value and the input signal so as to carry out digitalization. FIG. 16 shows a view of the operation.

Figure 17:
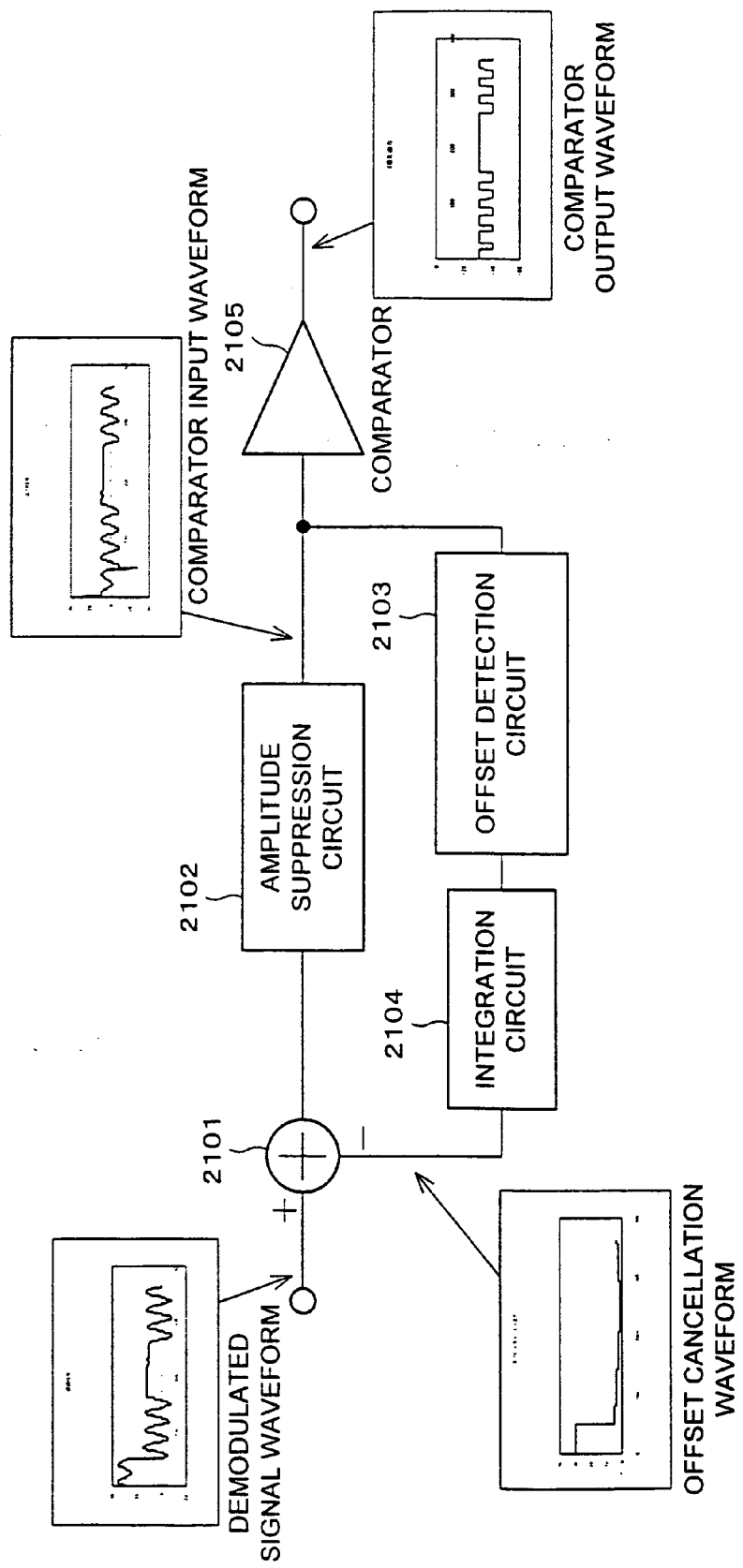
FIG. 17 is a block diagram showing an arrangement example of a floating slice level mode data slicer.

FIG. 17 shows a block diagram showing a floating slice level data slicer circuit of a data slicer according to the present invention. In this example, an offset cancellation section is provided, which is made up of an offset detection circuit 2103, an integration circuit 2104, and an addition circuit 2101 for performing subtraction of the output of the integration circuit 2104. A demodulated signal is first inputted to an addition circuit 2101. In the addition circuit 2101, the demodulated signal is added to the output (DC offset cancel voltage of the demodulated signal) of an integrator. Note that, in the actual operation, only the offset voltage is subtracted, as shown in the figure. The output of the addition circuit 2101 is inputted to an amplitude suppression circuit 2102. The amplitude suppression circuit 2102 decreases the gain with respect to a signal of large amplitude, and increases the gain with respect to a signal of small amplitude, before outputting the signals. The output of the amplitude suppression circuit 2102 is divided to be respectively supplied to a comparator 2105 and the offset detection circuit 2103. In the offset detection circuit 2103, when the signal voltage of the output from the amplitude suppression circuit 2102 is out of a certain voltage range, a voltage according to this voltage value greater than the voltage range is generated. By supplying this voltage value to the integration circuit 2104, a DC offset value of the input signal voltage is created. With this loop operation, i.e., by subtracting the DC offset value from the input signal voltage, the DC offset is always cancelled in the output of the amplitude suppression circuit 2102. The comparator 2105 carries out digitalization according to the polarity of the input voltage.

As described, in the present embodiment, digitalization can be carried out even in the case of having rapid fluctuation of DC voltage, by using a slicing method of a floating slice level mode which does not require a fixed threshold value, for the digitalization of the packet header. On the other hand, with respect to the part other than the packet header, since the DC voltage of the demodulated signal is stable, digitalization can be carried out by a method of a fixed slice mode while obtaining desired accuracy. Since no rapid fluctuation of the DC voltage occurs during the receipt of a desired signal, it is possible to obtain a threshold value with desired accuracy by determining the slice level based on the signal voltage of the packet header. By carrying out switching between the floating slice level mode and the fixed slice level mode at the end of digitalization of the packet header, it is possible to improve accuracy of digitalization for the other data (the data other than the packet header), which are not superposed. Since the packet header is superposed data, it is possible to make up for the basic disadvantage of the floating slice circuit, i.e., inadequacy of BER characteristic, by performing error correction. On this account, it is possible to obtain a data slicer practically superior in the BER characteristic on the whole.

Note that, the data slicer according to the present invention uses radio communication such as a TDMA mode or a FH mode for alternately carrying out sending and receiving, and carries out digitalization for processing an analog demodulation wave, which is made by demodulating a modulation signal. The modulation signal is created by modulating packet data, which is arranged so that plural kinds of data are included in the packet, and the header of the packet includes superposed ID data, which also works for synchronizing preamble and sending/receiving, and the length of the packet header is previously determined, and the sending time period of the packet is predictable except for the standby state, and the packet received in the standby state is made up of only the preamble and the superposed ID data. This data slicer of the present invention may additionally be provided with a plurality of slice circuits, and may be arranged so that a data slicer circuit of a floating slice level mode, which does not require a predetermined threshold value, is used as the slicing method for the packet header, and a data slicer circuit of a fixed slice level mode, whose threshold value does not follow rapid voltage fluctuation, is used as the slicing method for data other than the packet header.

With this arrangement, it is possible to accurately carry out digitalization with respect to a demodulated signal by using the floating slice level mode, whose threshold value follows rapid voltage fluctuation, as the slicing method for the packet header, and using the fixed slice level mode as the slicing method for the data other than the packet header, and creating the default slice level of the fixed slice level mode by using demodulated data in the packet header section, and carrying out the switching between the respective slicing methods with high accuracy.

Further, in addition to the foregoing arrangement, the data slicer according to the present invention may further be provided with a default threshold creation circuit for determining the default threshold of the fixed slicing method data slicer circuit, and may be arranged so that the default threshold circuit determines the default threshold by taking no account of output of the demodulated signal existing before the demodulated signal of the packet header.

In addition to the foregoing arrangement, the data slicer according to the present invention may further be arranged so that the default threshold creation circuit creates a default threshold value by using an intermediate voltage between a MIN voltage and a MAX voltage of amplitude of the demodulated signal of the packet header.

In addition to the foregoing arrangement, the data slicer according to the present invention may further be arranged so that the default threshold creation circuit creates the default threshold value by integrating the demodulated signal in an ID data section where ID data is supplied, the ID data being prepared by superposing same sets of data and provided at an end of the packet header.

In addition to the foregoing arrangement, the data slicer according to the present invention may further be provided with a shift register for storing the demodulated signal, and capable of storing data of not more than whole data amount of the demodulated signal in the packet header, and may be arranged so that the default threshold creation circuit reads a value stored in the shift register before and after the time of switching of slicing methods, and creates the default threshold value based on the value.

In addition to the foregoing arrangement, the data slicer according to the present invention may further be arranged so that the slice level creation circuit is supplied with the demodulated signal, and the shift register stores calculation result of the slice level for each predetermined data length, and the default threshold is created based on a value in the packet header stored in the shift register (data amount of the stored slice level is found by dividing the length of packet data by the predetermined data length) by reading out the value from the shift register by the default threshold creation circuit before and after the switching of the slicing methods.

In addition to the foregoing arrangement, the data slicer according to the present invention may further be arranged so that the slicing method is switched in response to output of an ID detection circuit, which includes means for detecting ID data in real time, and the selected slicing method is used for carrying out digitalization of data immediately after the ID data detection and later data.

Further, in addition to the foregoing arrangement, the data slicer according to the present invention may be arranged so that the slicing method is not switched in the standby state where the input timing of the packet is unpredictable, but is switched in other states where sending and receiving are synchronized with each other and the input timing of the packet signal is predictable. This is because the finish time of the packet header can be predicted in this case, and the slicing method can be switched at this timing.

In addition to the foregoing arrangement, the data slicer according to the present invention may further be provided with a fluctuation amount detection circuit for detecting fluctuation amount of the demodulation signal in a certain time period; and the demodulated signal is digitalized according to the polarity of the value of inclination thus judged by the polarity judgment circuit, when the fluctuation amount exceeds a certain value.

In addition to the foregoing arrangement, the data slicer according to the present invention may further be arranged so that, when a signal voltage becomes higher than a MAX voltage, the MAX voltage is renewed to be equal to the signal voltage; and when a signal voltage becomes lower than the MIN voltage, the MIN voltage is renewed to be equal to the signal voltage; and an intermediate voltage between the MAX voltage and the MIN voltage is used as a threshold value level, and the digitalization is carried out by comparing the threshold value level and the signal voltage.

Further, in addition to the foregoing arrangement, the data slicer according to the present invention may include an amplitude suppression circuit for suppressing amplitude difference of signals, a feedback circuit for detecting and outputting offset, an addition circuit for adding the output of the feedback circuit to the signal, and a comparator for carrying out digitalization according to the polarity of the output signal of the addition circuit.

As described, the data slicer according to the present invention includes a slicer circuit of a floating slice level mode, which follows DC voltage fluctuation, and carries out slice level operation with respect to the packet header; and a slicer circuit of a fixed slice level mode, which does not follow DC voltage fluctuation, and carries out slice level operation with respect to packet data other than the packet header.

With this arrangement, it is possible to carry out digitalization even in the standby state where the timing for receiving the input signal of the packet is unpredictable. Further, since the DC voltage becomes stabilized during the receipt of the packet header, the data slicer can use a data slicing method with a desirable BER and also not requiring consideration of rapid DC voltage fluctuation, with respect to the data after the packet header. Thus, it is possible to carry out digitalization with high-accuracy.

In addition to the foregoing arrangement, the data slicer according to the present invention further includes a default threshold creation circuit for determining a default threshold value in data slice operation of the fixed slice level mode; and is arranged so that the default threshold creation circuit creates the default threshold value of slice level of the slicer circuit of the fixed slice level mode, according to a measurement result of data included in the packet header.

In this arrangement, the default value of the slice level of the slicer circuit used for data after the packet header is created based on measurement result of the data included in the packet header. On this account, it is possible to provide an effect of obtaining an accurate slice level, in addition to the effect with the foregoing arrangement.

In addition to the foregoing arrangement, the data slicer according to the present invention is arranged so that the default threshold creation circuit creates a default threshold value by using an intermediate voltage between a MIN voltage and a MAX voltage of amplitude of the demodulated signal of the packet header.

In this arrangement, an intermediate voltage between a MIN peak level and a MAX peak level of demodulation signal of the packet header is detected, and used as the default threshold value. Thus, in addition to the foregoing effect, it is possible to provide an effect of obtaining a slice level for carrying out more exact digitalization.

In addition to the foregoing arrangement, the data slicer according to the present invention is arranged so that the default threshold creation circuit creates the default threshold value by integrating the demodulated signal in an ID data section where ID data is supplied, the ID data being prepared by superposing same sets of data and provided at an end of the packet header.

In this arrangement, only the DC component of the input signal can be taken out by cutting off the frequency component in the signal, and the DC component thus taken out can be used as a slice level. Therefore, in addition to the foregoing effects, it is possible to provide an effect of obtaining a slice level for carrying out more precise digitalization.

In addition to the foregoing arrangement, the data slicer according to the present invention further includes a shift register for storing the demodulated signal, and capable of storing data of not more than whole data amount of the demodulated signal in the packet header; and is arranged so that the default threshold creation circuit reads a value stored in the shift register before and after the time of switching the slicing methods, and creates the default threshold value based on the value.

With this arrangement, since the demodulated data before the packet header is pushed out, and the shift register cannot store the data thus pushed out, only the demodulation data of the packet header is stored in the shift register. Therefore, in addition to the foregoing effects, it is possible to provide an effect of creating more precise default threshold.

In addition to the foregoing arrangement, the data slicer according to the present invention further includes a threshold creation circuit for being supplied with the demodulated signal so as to create a slice level, and a shift register for storing the slice level created by the threshold creation circuit, the shift register storing the slice level for each fixed data length; and is arranged so that the default threshold creation circuit reads a value stored in the shift register before and after the time of switching the slicing methods, and creates the default threshold value based on the value.

In this arrangement, the threshold value can be created only based on the demodulated signal of the packet header, since the value is determined by using the data stored in the shift register. Therefore, in addition to the foregoing effects, it is possible to provide an effect of creating more precise default threshold.

In addition to the foregoing arrangement, a data slicer according to the present invention further includes an ID detection circuit for detecting ID data, which is prepared by superposing same sets of data and provided at an end of the packet header; and is arranged so that the fixed slice level mode is selected in response to output of the ID detection circuit, to be used as a slicing method for carrying out digitalization of data immediately after the ID data detection and later data.

With this arrangement, since the slicing method is switched after the ID data detection, the switching timing of the slicing method becomes more exact. Therefore, in addition to the foregoing effects, it is possible to provide an effect of realizing a data slicer with higher accuracy.

In addition to the foregoing arrangement, a data slicer according to the present invention further includes a packet header time storing section for storing packet header receiving time, which is a time period consumed for receiving the packet header from a beginning to an end; and is arranged so that the fixed slice level mode is selected as a slicing method of the digitalization when the packet header receiving time is elapsed from a beginning of the receipt of packet data, the packet header receiving time being stored in the packet header storing section.

With this arrangement, even without the ID data detection, the slicing method is switched after a certain time period, which is from the beginning of the receipt of the packet data to the end of the receipt of the ID data, i.e., the method is switched at the end of the packet header. Therefore, in addition to the foregoing effects, it is possible to provide an effect of realizing a data slicer with higher accuracy.

In addition to the foregoing arrangement, a data slicer according to the present invention further includes a fluctuation amount detection circuit for detecting fluctuation amount of the demodulation signal in a certain time period; and a polarity judgment circuit for judging polarity of value of inclination which shows fluctuation quantity of the demodulated signal, and is detected by the fluctuation amount detection circuit; and is arranged so that the demodulated signal is digitalized according to the polarity of the value of inclination thus judged by the polarity judgment circuit.

With this arrangement, since the digitalization is carried out according to the polarity of the inclination of voltage fluctuation, the digitalization of the signal can basically be carried out without depending on the DC level of the input signal. Therefore, in addition to the foregoing effects, it is possible to provide an effect of realizing a data slicer with higher accuracy.

In addition to the foregoing arrangement, a data slicer according to the present invention is arranged so that when a signal voltage becomes higher than a MAX voltage, the MAX voltage is renewed to be equal to the signal voltage, and a MIN voltage is determined by subtracting a predetermined value from the MAX value, and when a signal voltage becomes lower than the MIN voltage, the MIN voltage is renewed to be equal to the signal voltage, and the MAX voltage is determined by adding the predetermined value to the MIN value, and an intermediate voltage between the MAX voltage and the MIN voltage is used as a threshold value level, and the digitalization is carried out by comparing the threshold value level and the signal voltage.

In this arrangement, the MAX voltage and the MIN voltage are set to have a constant voltage difference. Thus, in addition to the foregoing effects, it is possible to provide an effect of carrying out more precise digitalization, by suppressing influence of amplitude difference between the high frequent component and the low frequent component due to the influence of the filter. Further, even in case of having rapid DC level fluctuation of the input signal, this arrangement is capable of suppressing the influence of the rapid fluctuation, thereby carrying out more precise digitalization.

In addition to the foregoing arrangement, a data slicer according to the present invention further includes an amplitude suppression circuit for being supplied with the demodulated signal, and for reducing amplitude difference between a low frequency component and a high frequency component of the demodulated signal as an input signal; and an offset cancellation section for reducing the input signal supplied to the amplitude suppression circuit so as to cancel an excess voltage from a maximum limit value or a minimum limit value, when a voltage of the demodulated signal as an output signal from the amplitude suppression circuit is greater than the maximum limit value or smaller than the minimum limit value; and is arranged so that the digitalization is carried out according to the polarity of output from the amplitude suppression circuit.

Therefore, in addition to the foregoing effects, even in case of having rapid DC level fluctuation of the input signal, it is possible to suppress the influence of the rapid fluctuation, thereby carrying out more precise digitalization.

The embodiments and concrete examples of implementation discussed in the foregoing detailed explanation serve solely to illustrate the technical details of the present invention, which should not be narrowly interpreted within the limits of such embodiments and concrete examples, but rather may be applied in many fluctuations within the spirit of the present invention, provided such fluctuations do not exceed the scope of the patent claims set forth below.

What is claimed is:

1. A data slicer for carrying out digitalization of a demodulated signal obtained through receipt of packet data, which is made up of a packet header and user data sent after the packet header, comprising:
    a slicer circuit of a floating slice level mode, which follows DC voltage fluctuation, and carries out slice level operation with respect to the packet header; and
    a slicer circuit of a fixed slice level mode, which does not follow DC voltage fluctuation, and carries out slice level operation with respect to packet data other than the packet header.

2. The data slicer as set forth in claim 1, further comprising:
    a default threshold creation circuit for determining a default threshold value in data slice operation of the fixed slice level mode,
    wherein:
    the default threshold creation circuit creates a default value of slice level of the slicer circuit of the fixed slice level mode, according to a measurement result of data included in the packet header.

3. The data slicer as set forth in claim 2, wherein:
    the default threshold creation circuit creates a default threshold value by using an intermediate voltage between a MIN voltage and a MAX voltage of amplitude of the demodulated signal of the packet header.

4. The data slicer as set forth in claim 2, wherein:
    the default threshold creation circuit creates the default threshold value by integrating the demodulated signal in an ID data section where ID data is supplied, the ID data being prepared by superposing same sets of data and provided at an end of the packet header.

5. The data slicer as set forth in claim 3, further comprising:
    a shift register for storing the demodulated signal, and capable of storing data of not more than whole data amount of the demodulated signal in the packet header,
    wherein:
    the default threshold creation circuit reads a value stored in the shift register before and after a time of switching slicing methods, and creates the default threshold value based on the value.

6. The data slicer as set forth in claim 4, further comprising:
    a shift register for storing the demodulated signal, and capable of storing data of not more than whole data amount of the demodulated signal in the packet header,
    wherein:
    the default threshold creation circuit reads a value stored in the shift register before and after switching of slicing methods, and creates the default threshold value based on the value.

7. The data slicer as set forth in claim 3, further comprising:
    a threshold creation circuit for being supplied with the demodulated signal so as to create a slice level; and
    a shift register for storing the slice level created by the threshold creation circuit, the shift register storing the slice level for each fixed data length,
    wherein:
    the default threshold creation circuit reads a value stored in the shift register before and after switching of slicing methods, and creates the default threshold value based on the value.

8. The data slicer as set forth in claim 4, further comprising:
    a threshold creation circuit for being supplied with the demodulated signal so as to create a slice level; and
    a shift register for storing the slice level created by the threshold creation circuit, the shift register storing the slice level for each fixed data length,
    wherein:
    the default threshold creation circuit reads a value stored in the shift register before and after switching of slicing methods, and creates the default threshold value based on the value.

9. The data slicer as set forth in claim 2, further comprising:
    an ID detection circuit for detecting ID data, which is prepared by superposing same sets of data and provided at an end of the packet header,
    wherein:
    the fixed slice level mode is selected in response to output of the ID detection circuit, to be used as a slicing method for carrying out digitalization of data immediately after the ID data detection and later data.

10. The data slicer as set forth in claim 2, further comprising:
    a packet header time storing section for storing packet header receiving time, which is a time period consumed for receiving the packet header from a beginning to an end,
    wherein:
    the fixed slice level mode is selected as a slicing method of the digitalization when the packet header receiving time is elapsed from a beginning of the receipt of packet data, the packet header receiving time being stored in the packet header storing section.

11. The data slicer as set forth in claim 1, further comprising:
    a fluctuation amount detection circuit for detecting fluctuation amount of the demodulation signal in a certain time period; and
    a polarity judgment circuit for judging polarity of value of inclination which shows fluctuation quantity of the demodulated signal, and is detected by the fluctuation amount detection circuit, wherein:

the demodulated signal is digitalized according to the polarity of the value of inclination thus judged by the polarity judgment circuit.

12. The data slicer as set forth in claim 1, wherein:

when a signal voltage becomes higher than a MAX voltage, the MAX voltage is renewed to be equal to the signal voltage, and a MIN voltage is determined by subtracting a predetermined value from the MAX value, when a signal voltage becomes lower than the MIN voltage, the MIN voltage is renewed to be equal to the signal voltage, and the MAX voltage is determined by adding the predetermined value to the MIN value, and an intermediate voltage between the MAX voltage and the MIN voltage is used as a threshold value level, and the digitalization is carried out by comparing the threshold value level and the signal voltage.

13. The data slicer as set forth in claim 1, further comprising:

an amplitude suppression circuit for being supplied with the demodulated signal, and for reducing amplitude difference between a low frequency component and a high frequency component of the demodulated signal as an input signal, an offset cancellation section for reducing the input signal supplied to the amplitude suppression circuit so as to cancel an excess voltage from a maximum limit value or a minimum limit value, when a voltage of the demodulated signal as an output signal from the amplitude suppression circuit is greater than the maximum limit value or smaller than the minimum limit value, wherein:

the digitalization is carried out according to the polarity of output from the amplitude suppression circuit.

14. The data slicer of claim 1, wherein:

the packet header comprises preamble data and ID data following the preamable data, and the slicer circuit of the floating slice level mode carries out the slice level operation with respect to both the preamble data and the ID data.

* * * * *